US006643722B1

(12) United States Patent
Scaringella et al.

(10) Patent No.: US 6,643,722 B1
(45) Date of Patent: Nov. 4, 2003

(54) DATA STORAGE SYSTEM HAVING DIRECTOR BOARDS WITH PLURAL PROCESSORS

(75) Inventors: Stephen L. Scaringella, Holliston, MA (US); Kenneth Sullivan, Hudson, MA (US); Rudy Bauer, Clinton, MA (US)

(73) Assignee: EMC Corporation, Hopkinton, MA (US)

( * ) Notice: Subject to any disclaimer, the term of this patent is extended or adjusted under 35 U.S.C. 154(b) by 404 days.

(21) Appl. No.: 09/821,102

(22) Filed: Mar. 29, 2001

(51) Int. Cl.[7] ............................................... G06F 13/12
(52) U.S. Cl. ........................... 710/74; 710/62; 710/107; 709/302; 711/100
(58) Field of Search ................................ 710/1, 13, 18, 710/29, 33, 36, 62, 72–74, 107, 129; 712/225; 709/302; 711/202, 150, 100

(56) References Cited

U.S. PATENT DOCUMENTS

| 5,206,939 A | * | 4/1993 | Yanai et al. | ................. 395/400 |
| 5,884,055 A | * | 3/1999 | Tung et al. | .................. 710/127 |
| 6,006,342 A | * | 12/1999 | Beardsley et al. | ............. 714/5 |
| 6,513,097 B1 | * | 1/2003 | Beardsley et al. | .......... 711/113 |
| 6,560,573 B1 | * | 5/2003 | Scaringella et al. | .......... 703/27 |
| 6,578,128 B1 | * | 6/2003 | Arsenault et al. | ........... 711/202 |

\* cited by examiner

Primary Examiner—Jeffrey Gaffin
Assistant Examiner—Rijue Mai
(74) Attorney, Agent, or Firm—Daly, Crowley & Mofford, LLP

(57) ABSTRACT

A data storage system wherein a host computer is coupled to a bank of disk drives through an interface. The interface has a plurality of directors and a memory interconnected by a buss. The directors control data transfer between the host computer and the bank of disk drives as such data passes through the memory. The interface includes a plurality of ESCON adapters, a front end portion of the directors being coupled between the host computer and the busses through the ESCON adapters. Each one of such adapters includes a plurality of adapter ports each one being coupled to a corresponding port of the host computer. Each one of the adapters also includes a plurality of adapter board gate arrays and a plurality of optic interfaces. Each one of the optic interfaces is coupled between a corresponding one of the adapter port and a corresponding one of the adapter board gate arrays. Each coupled optic interfaces and gate array provides a corresponding one of a plurality of channels for the data. The adapter also includes a plurality of adapter board CPUs, each one being coupled to the adapter board gate arrays and the optic interface of a corresponding one of the channels. Each one of the CPUs controls the initiation and termination of the data passing through said corresponding one of the channels. Each one of the front end portion of the director boards includes a plurality of director board gate arrays and a plurality of EDACs. Each pair of the director board gate arrays is coupled between a corresponding pair of the adapter board gate arrays and a corresponding one of the EDACs. A plurality of director board CPUs is provided. Each one is coupled to a corresponding one of the adapter board CPUs. Each one of the director board CPUs is coupled to a corresponding one of the director board gate arrays to control the initiation and termination of a data transfer through such coupled one of the director gate arrays. A common state machine is coupled to the plurality of director gate arrays and the plurality of EDACs for arbitrating between the pair of director gate arrays coupled to the corresponding one of the EDACs for access to such corresponding one of the EDACs. Each one of the directors comprises: a plurality of dual port RAMs, each one being coupled to a corresponding one of the EDACs and to at least one of the busses. A second common state machine is coupled to the first common state machine and the plurality of dual port RAMs for arbitrating between the plurality of dual port RAMS for access to one the at least one of the busses.

10 Claims, 23 Drawing Sheets

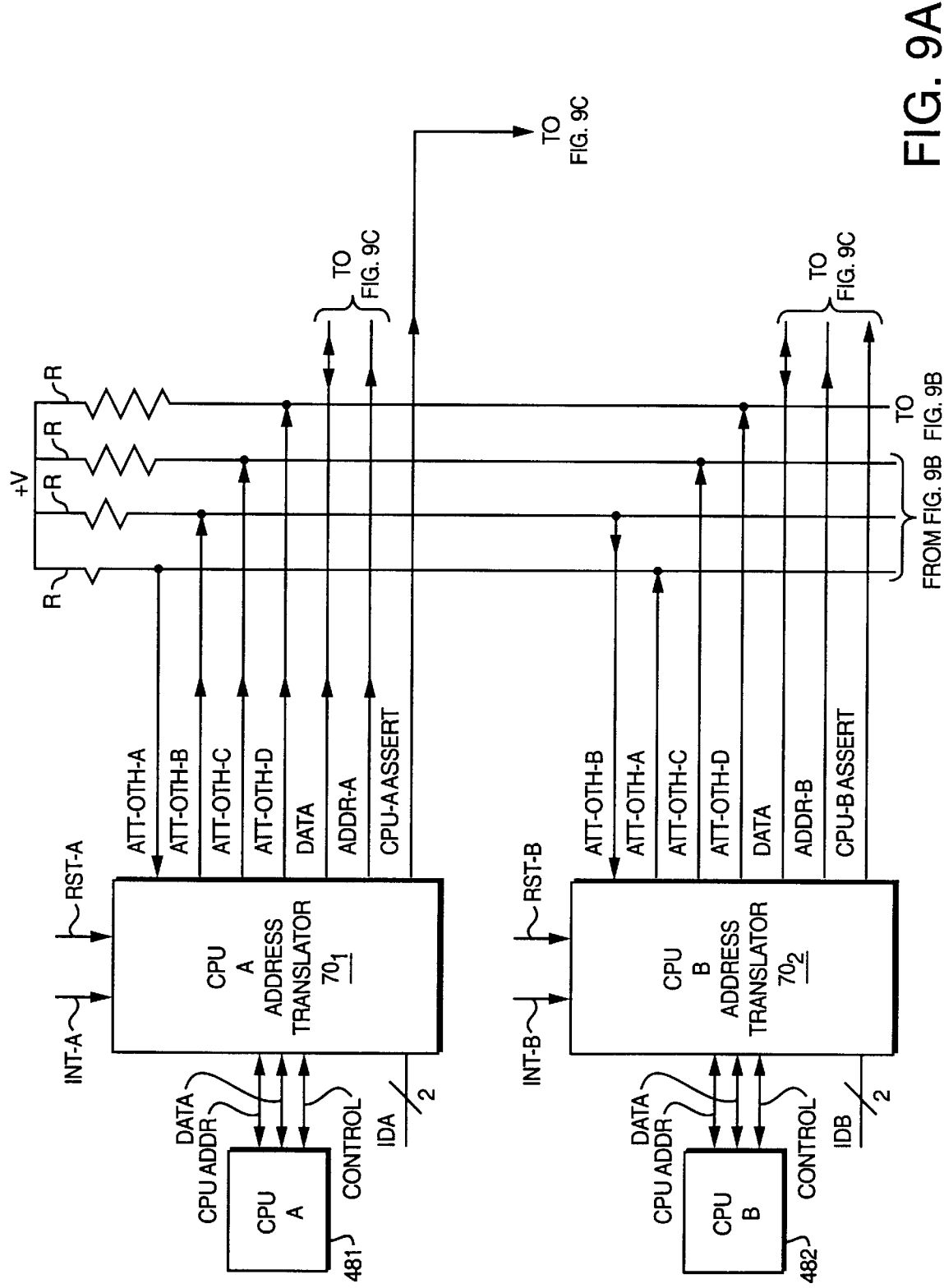

DATA STORAGE SYSTEM HAVING DIRECTOR BOARDS WITH PLURAL PROCESSORS

TECHNICAL FIELD

This invention relates to data storage systems and more particularly to data storage systems adapted to store data in, and retrieve data from, a bank of disk drives through a high speed cache or global memory interface disposed between the bank of disk drives and a host computer.

BACKGROUND

As is known in the art, large mainframe, or host computer systems require large capacity data storage systems. These large computer systems generally include data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers (or directors) and "back end" disk controllers (or directors). The interface operates the controllers (or directors) in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers (or directors) and disk controllers (or directors), addressable cache memories. The cache memory is a semiconductor memory and is provided to rapidly store data from the main frame computer system before storage in the disk drives, and, on the other hand,store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk directors are mounted on disk director printed circuit boards. CPU directors are mounted on CPU controller printed circuit boards. And, cache memories are mounted on cache memory printed circuit boards. The disk director, CPU director and cache memory printed circuit boards plug into the backplane printed circuit board. In order to provide data integrity in case of a failure in a controller, the backplane printed circuit board has a pair of buses. One set the disk controllers is connected to one bus and another set of the disk controllers is connected to the other bus. Likewise, one set the CPU directors is connected to one bus and another set of the CPU directors is connected to the other bus. The cache memories are connected to both buses. Each one of the buses provides data, address and control information. Thus, the use of two buses provides a degree of redundancy to protect against a total system failure in the event that the controllers, or disk drives connected to one bus fail. Further, the use of two buses increases the data transfer bandwidth of the system compared to a system having a single bus. A four bus system is described in co-pending patent application Ser. No. 09/223,115 filed Dec. 30, 1998, entitled Data Storage Systems, inventors Tuccio et al., assigned to the same assignee as the present invention, the entire subject matter thereof being incorporated herein by reference.

As noted above, the directors and cache memories are on printed circuit boards which plug into the backplane. As is also known in the art, the front end directors may be coupled to the host computer through a variety of front-end adapters, such as SCSI, fibre channel, Enterprise Systems Connection (ESCON), etc. For example, referring to FIG. 1, a front end director printed circuit board adapted for use in the two bus system described above, is shown coupled to an ESCON front-end adapter. It is noted that the front-end adapter has a pair of ports H1 and H2 adapted to couple to a pair of host computer ports. It is noted that the adapter is itself a printed circuit board which plugs into one side or the backplane as described in the above-referenced co-pending patent application for the four bus configuration. As described in such patent application, the director printed circuit board plugs into the opposite side of the printed circuit board.

Referring to FIG. 1, the two bus system described above is shown. An exemplary one of the front end adapters used in such system is shown in FIG. 2 to include a pair of optical interfaces each of which is coupled to a gate array. Each gate array, and the optical interface coupled thereto, is controlled by a CPU on the adapted board. The gate array, under control of its CPU, controls the flow of data between the front end director and the host computer. Thus, with such an arrangement, there are two independent data channels, Channel A and Channel B, between the host computer and each controller printed circuit board.

The control of data between the front end adapted board and the global cache memory connected to the director board, is through a pair of CPUs on the director board. These director board CPUs provide such control through communication with a corresponding one of the pair CPUs on the adapter board. The communication is through a corresponding one of a pair of shared memories, as indicated. It is noted that the two gate arrays in the director board are coupled to the global cache memory through a common data channel, here an SD I/O bus. The shared data channel includes a dual port RAM and an EDAC. as described in U.S. Pat. No. 5,890,207 entitled High Performance Integrated Cache Storage Device, inventors Sne et al, issued Mar. 30, 1999, assigned to the same assignee as the present invention the entire subject matter thereof being incorporated herein by reference. Arbitration for the common channel (i.e., for the SD I/O bus) is through a lower machine, as described in U.S. Pat. No. 5,890,207. Arbitration for the port of the dual port RAM (i.e., the port connected to the EDAC and the port connected to the global cache memory) is through the upper machine, as described in U.S. Pat. No. 5,890,207.

In operation, and considering data passing from the host computer to the cache memory, the front end adapter gate array configures the data into, here 32 bit memory data words. The director CPUs package the 32 bit data words into here 64 bit memory data words. Requests for the SD I/O bus from the pair of director gate arrays are arbitrated by the lower machine via control signals ARB SD I/O, as indicated. The lower machine controls the EDAC and the dual port RAM. The start address for the data to be stored in the global cache memory is provided by address gate arrays under the control of the director CPUs and the lower machine. Further, considering, for example, that Channel A data is being processed by the EDAC and the data is then presented to the Channel B during such processing of the Channel A data, the lower machine prevents the data in Channel B from passing to the EDAC until completion of the processing of the Channel A data. The passing of data from the global cache memory to the host computer is by reciprocal operation.

Referring now to FIG. 3, another front end adapter/ front end director configuration is shown for use the with two bus arrangement described above in connection with FIG. 1. Here, however, there are four ports H1, H2, H3 and H4 connecting the front end adapter to the host computer. While the director operates as described above in connection with FIG. 2, here there are four optic interfaces connected to the four ports H1, H2, H3 and H4, as indicated. Again there are only two gate arrays in the front end adapter each controlled by a corresponding one of the pair of front end adapter board CPUs. Here again there are only two independent data channels, Channel A and Channel B. Thus, while there are here four ports for connection to the host computer, there are still only two independent data channels, Channel A and Channel B (i.e., arbitration is required between ports H1 and H2 for Channel A and arbitration between ports H3 and H4 for Channel B).

Referring now to FIG. 4, a front end adapted and front end director arrangement is shown adapted for use in the four bus arrangement described in the above-referenced co-pending patent application. As described in such co-pending patent application, each director is coupled to a pair of the four busses. One of such busses is coupled to a "high address" memory section (MH) of the global cache memory and the other bus is coupled to a "low address" (ML) memory section of the global cache memory. It is first noted that the front end adapter is the same as that described above in connection with FIG. 3. Here, however, the director has two EDACs and thus a pair of data channels, XSD I/O and YSD I/O, as indicated. Thus, here data Channel A is coupled to a first one of the pair of EDACs via the XSD I/O bus and data Channel B is coupled to the other one of the pair of EDACs though the YSD I/O bus, as indicated. Each EDAC is coupled to a corresponding one of a pair of dual port RAMs, as shown. The dual port RAMS are coupled to the "high address" memory section (MH) of the global cache memory or the "low address" (ML) though transceivers (XCVRs) under the control of the upper machine, as indicated. Thus, as in the case of the configuration described above in connection with FIG. 3, while each front end director board has four ports with which to connect to the host computer, there are only two independent data channels, i.e., Channel A and Channel B. Thus, arbitration is required between ports H1 and H2 for Channel A and arbitration between ports H3 and H4 for Channel B), as indicated.

It should be noted that in all the configurations described above in connection with FIGS. 1 through 4, the CPUs start the transfer of data, stop the transfer of data and monitors the transfer of data; however, the CPUs do not actually move the data. Thus, the gate arrays move the data and thus the transfer of data to, and from, the cache memory is a DMA (direct memory access) transfer.

SUMMARY

In accordance with the present invention, a data storage system is provided wherein a host computer is coupled to a bank of disk drives through an interface. The interface includes a plurality of directors and a memory interconnected by a busses. The directors control data transfer between the host computer and the bank of disk drives as such data passes through the memory. The interface includes a plurality of ESCON adapters. A front end portion of the directors is coupled between the host computer and the busses through the ESCON adapters. Each one of the adapters comprises: a plurality of adapter ports each one being coupled to a corresponding port of the host computer; a plurality of adapter board gate arrays; a plurality of optic interfaces, each one being coupled between a corresponding one of the adapter port and a corresponding one of the adapter board gate arrays, wherein each coupled optic interfaces and gate array provides a corresponding one of a plurality of channels for the data; a plurality of adapter board CPUs, each one of the adapter board CPUs being coupled to the adapter board gate arrays and the optic interface of a corresponding one of the channels, each one of the CPUs controlling the initiation and termination of the data passing through said corresponding one of the channels. Each one of the front end portion of the director boards comprises: a plurality of director board gate arrays; and a plurality of EDACs. Each pair of the director board gate arrays is coupled between a corresponding pair of the adapter board gate arrays and a corresponding one of the EDACs. The plurality of director board CPUs is provided, each one being coupled to a corresponding one of the adapter board CPUs. Each one of the director board CPUs is coupled to a corresponding one of the director board gate arrays to control the initiation and termination of a data transfer through such coupled one of the director gate arrays. A common state machine is coupled to the plurality of director gate arrays and the plurality of EDACs for arbitrating between the pair of director gate arrays coupled to the corresponding one of the EDACs for access to such corresponding one of the EDACs.

In accordance with another feature of the invention, each one of the directors comprises: a plurality of dual port RAMs, each one being coupled to a corresponding one of the EDACs and to at least one of the busses; and a second common state machine coupled to the first common state machine and the plurality of dual port RAMs for arbitrating between the plurality of dual port RAMS for access to one the at least one of the busses.

DESCRIPTION OF DRAWINGS

FIGS. 9A, 9B and 9C are a more detailed block diagram of FIG. 8;

Like reference symbols in the various drawings indicate like elements.

DETAILED DESCRIPTION

Figure 1:
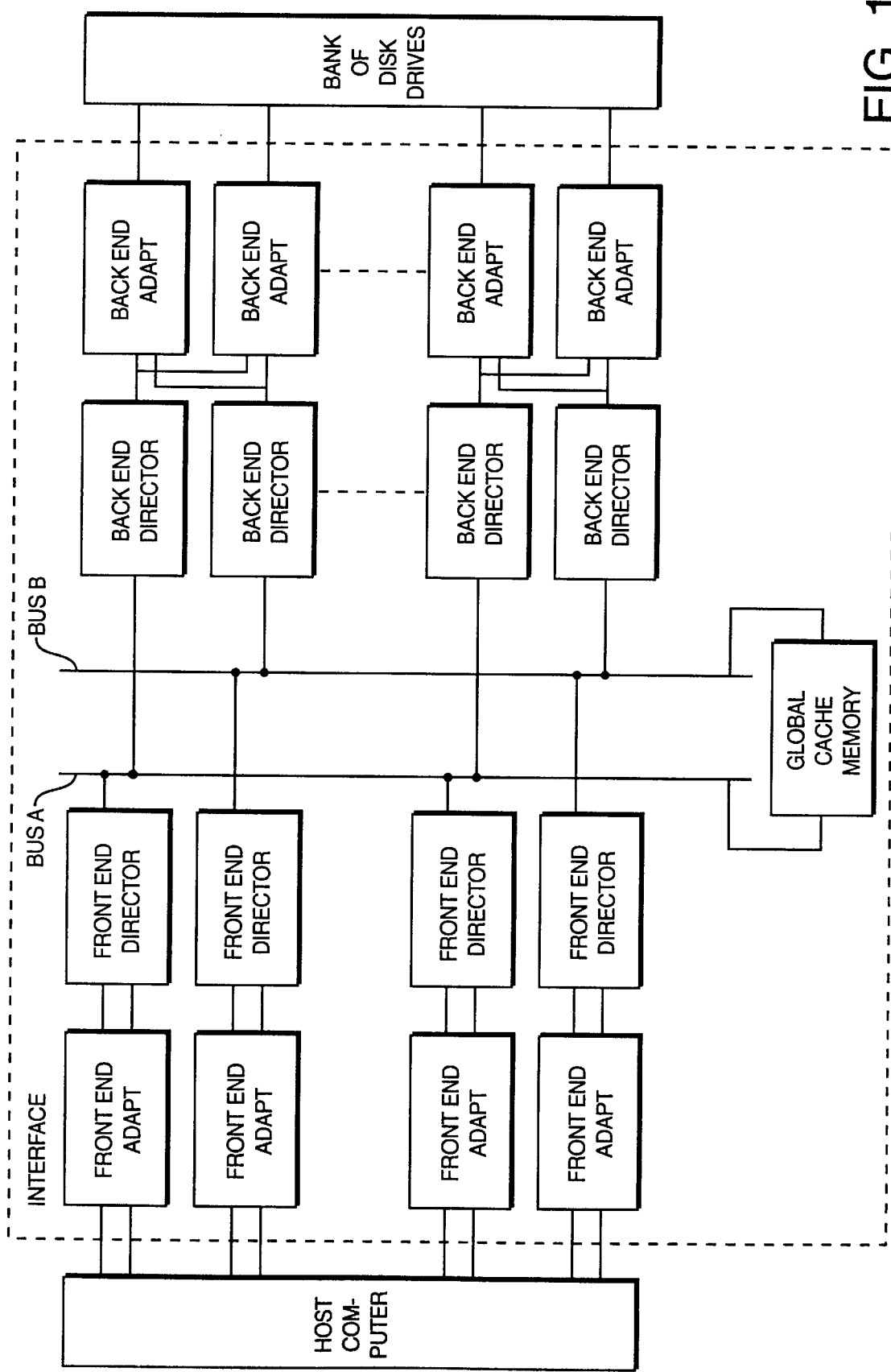
FIG. 1 is a block diagram of a two bus data storage system according to the PRIOR ART.
Figure 2:
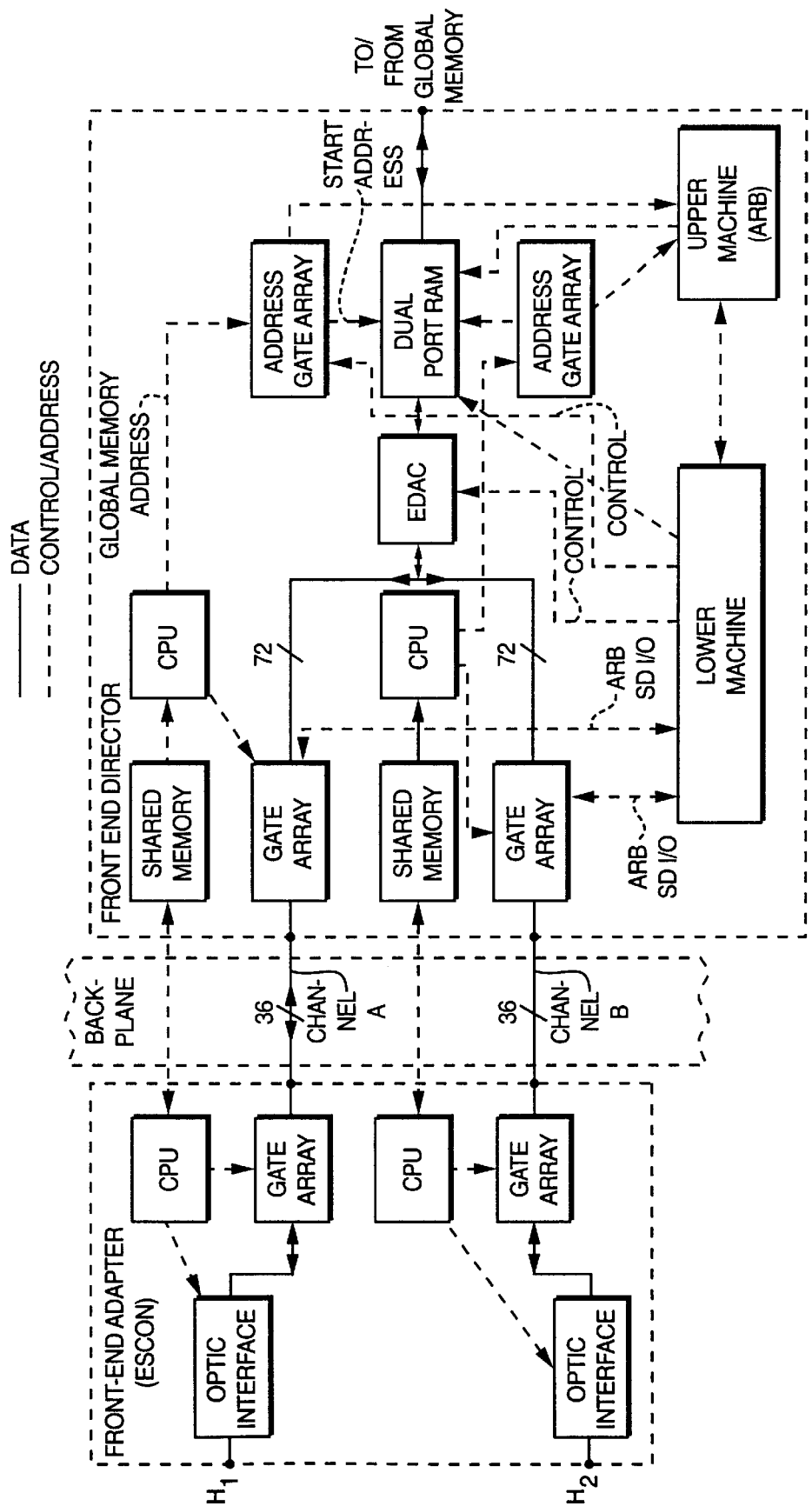
FIGS. 2 and 3 are block diagrams of an ESCON front end adapter for use in the two bus system of FIG. 1 such adapter being coupled to its front end director according to the prior art.
Figure 3:
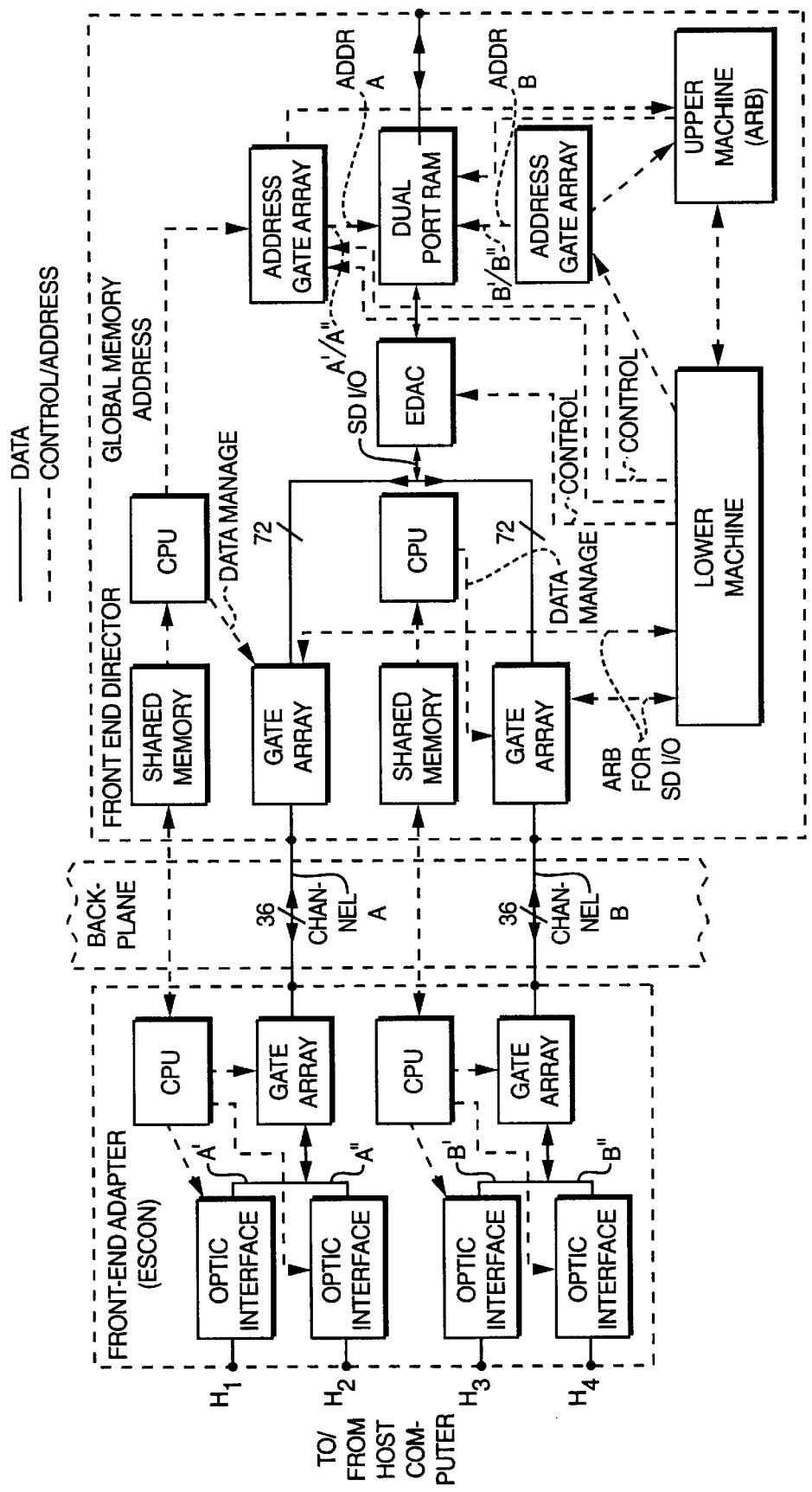
Figure 4:
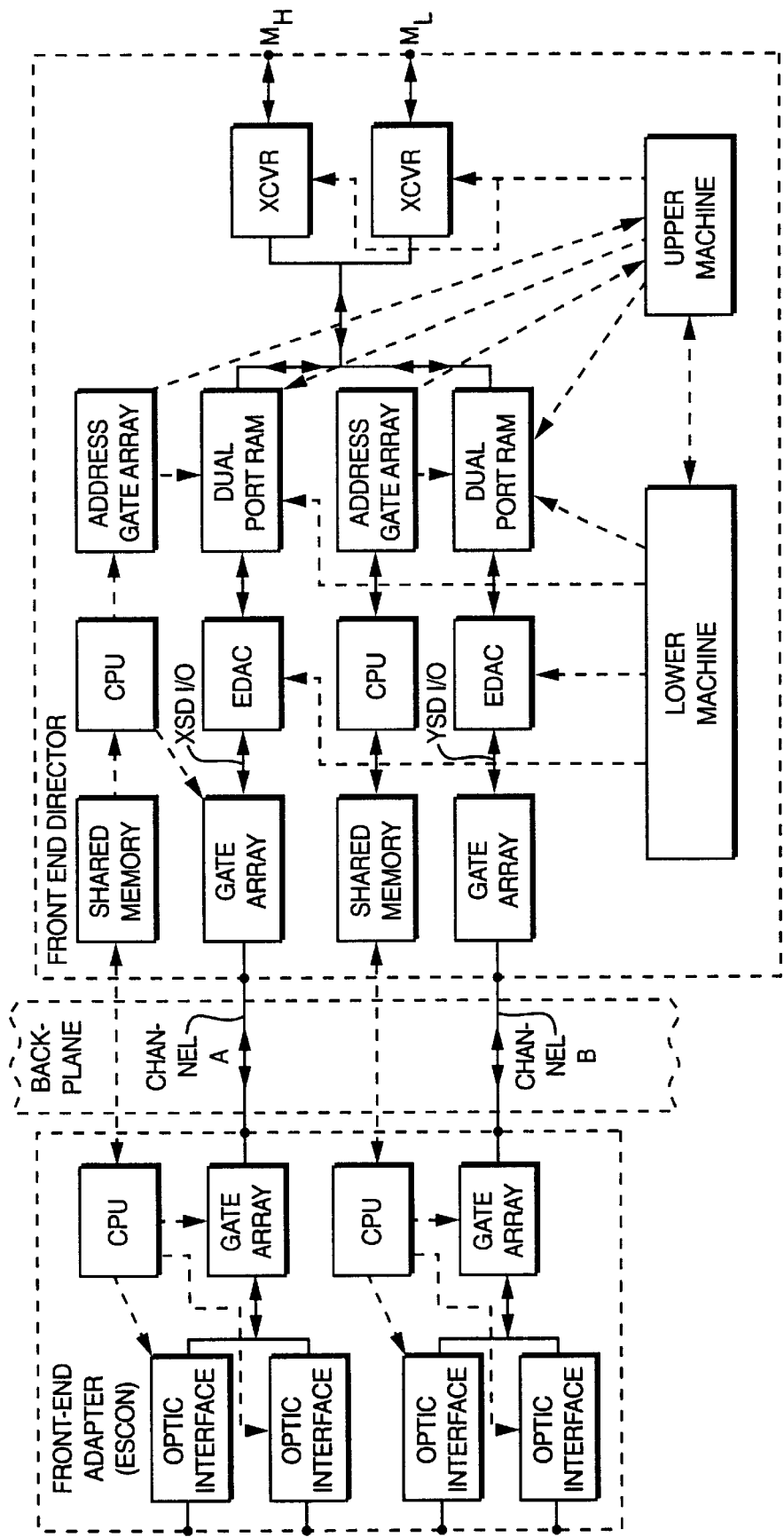
FIG. 4 is block diagrams of an ESCON front end adapter for use in a four bus system according to the PRIOR ART.
Figure 5A:
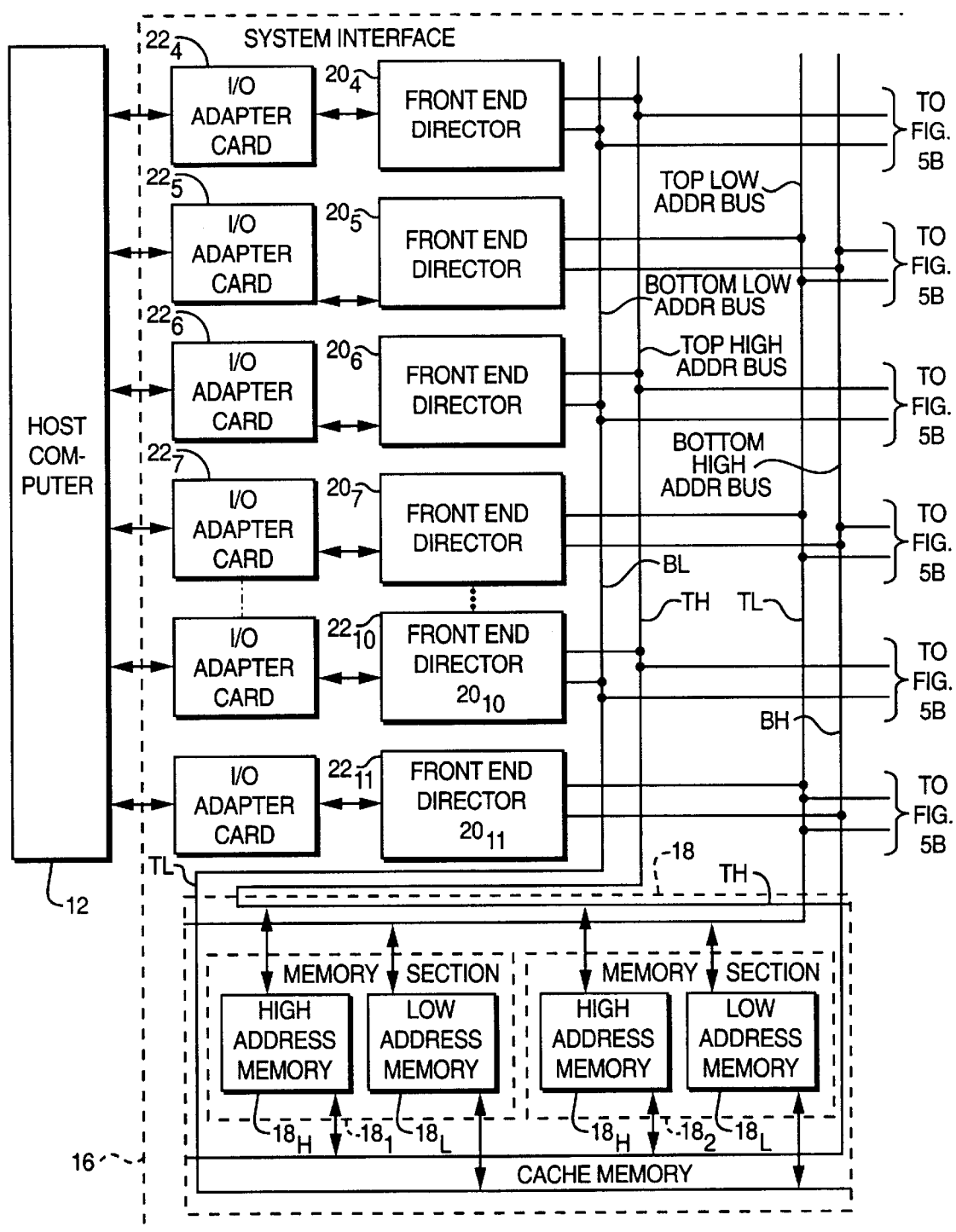
FIGS. 5A and 5B are a four bus data storage system having ESCON front end adapters and front end directors according to the invention.
Figure 5B:
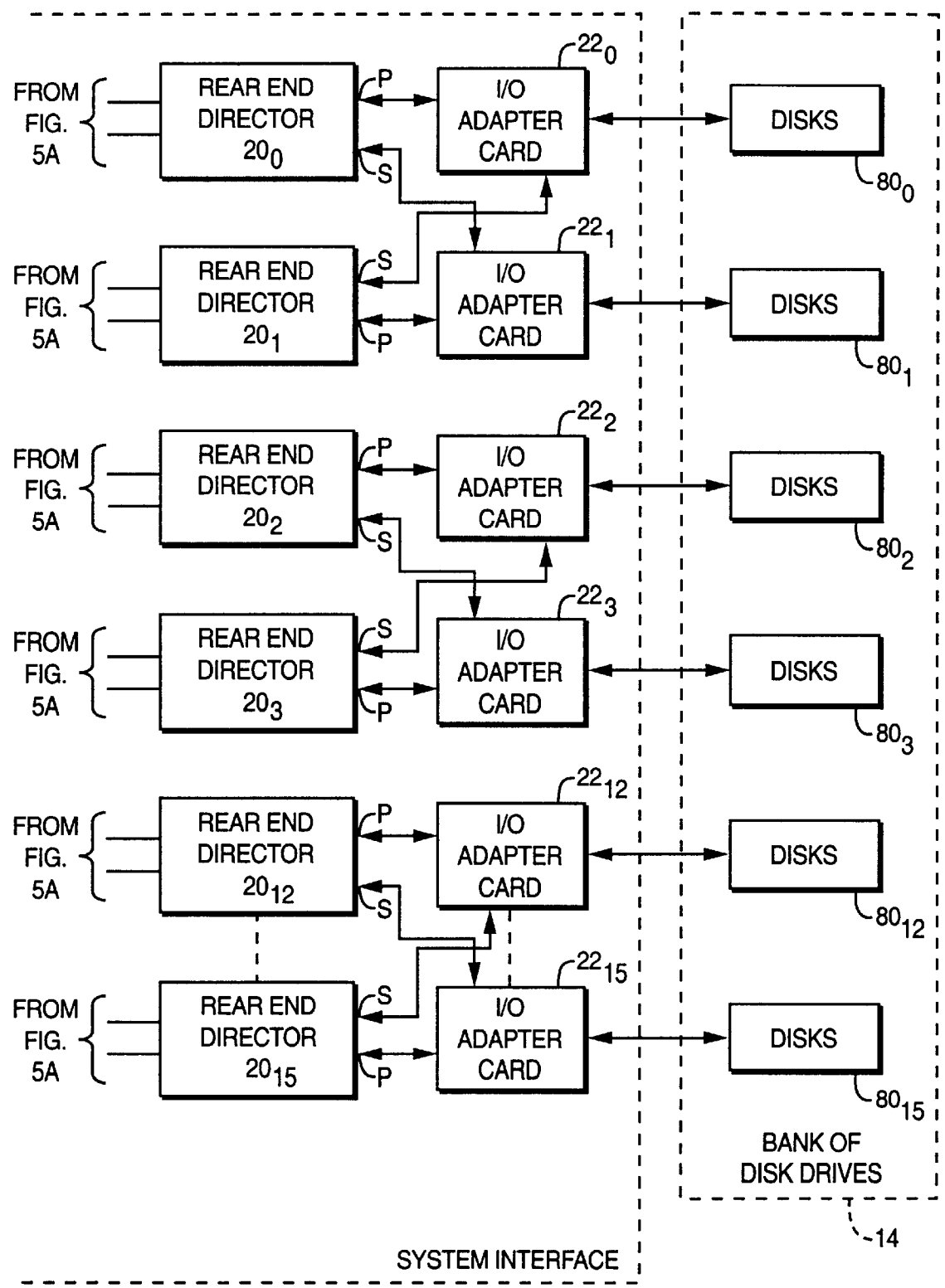

Referring now to FIGS. 5A and 5B, a data storage system 10 is shown wherein a host computer 12 is coupled to a bank 14 of disk drives through a system interface 16. The system interface 16 includes a cache memory 18, having high address memory sections 18H and low address memory sections 18L. A plurality of directors $20_0$–$20_{15}$ is provided for controlling data transfer between the host computer 12 and the bank 14 of disk drives as such data passes through the cache memory 18. A pair of high address busses TH, BH is electrically connected to the high address memory sections 18H. A pair of low address busses TL, BL electrically connected to the low address memory sections 18L. The cache memory 18 has a plurality of storage location addresses. Here, the storage locations having the higher addresses are in the high address memory sections 18H and the storage locations having the lower addresses are in the low address memory sections 18L. It should be noted that each one of the directors $20_0$–$20_{15}$ is electrically connected to one of the pair of high address busses TH, BH and one of the pair of low address busses TL, BL. Thus, each one of the directors $20_0$–$20_{15}$ is able to address all locations in the entire cache memory 18 (i.e., to both the high address memory sections 18H and the low address memory sections 18L) and is therefore able to store data in and retrieve data from any storage location in the entire cache memory 18.

More particularly, a back end portion of the directors, here directors $20_0$–$20_3$ and $20_{12}$–$20_{15}$, is electrically connected to the bank 14 of disk drives through I/O adapter cards $22_0$–$22_3$ and $22_{12}$–$22_{15}$ and a front-end portion of the directors, here directors $20_4$–$20_{11}$, is electrically connected to the host computer 12 through I/O adapter cards $22_4$–$22_{11}$.

In operation, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low address memory bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the back-end directors $20_0$–$20_3$ and $20_{12}$–$20_{15}$ is to handle this request. The Table maps the host computer 12 address into an address in the bank 14 of disk drives. The front-end director then puts a notification in a "mail box" (not shown and stored in the cache memory 18) for the back-end director which is to handle the request, the amount of the data and the disk address for the data. Other back-end directors poll the cache memory 18 when they are idle to check their "mail boxes". If the polled "mail box" indicates a transfer is to be made, the back-end director processes the request, addresses the disk drive in the bank, reads the data from the cache memory and writes it into the addresses of a disk drive in the bank 14. When data is to be read from the disk drive to the host computer 12 the system operates in a reciprocal manner.

Figure 6:
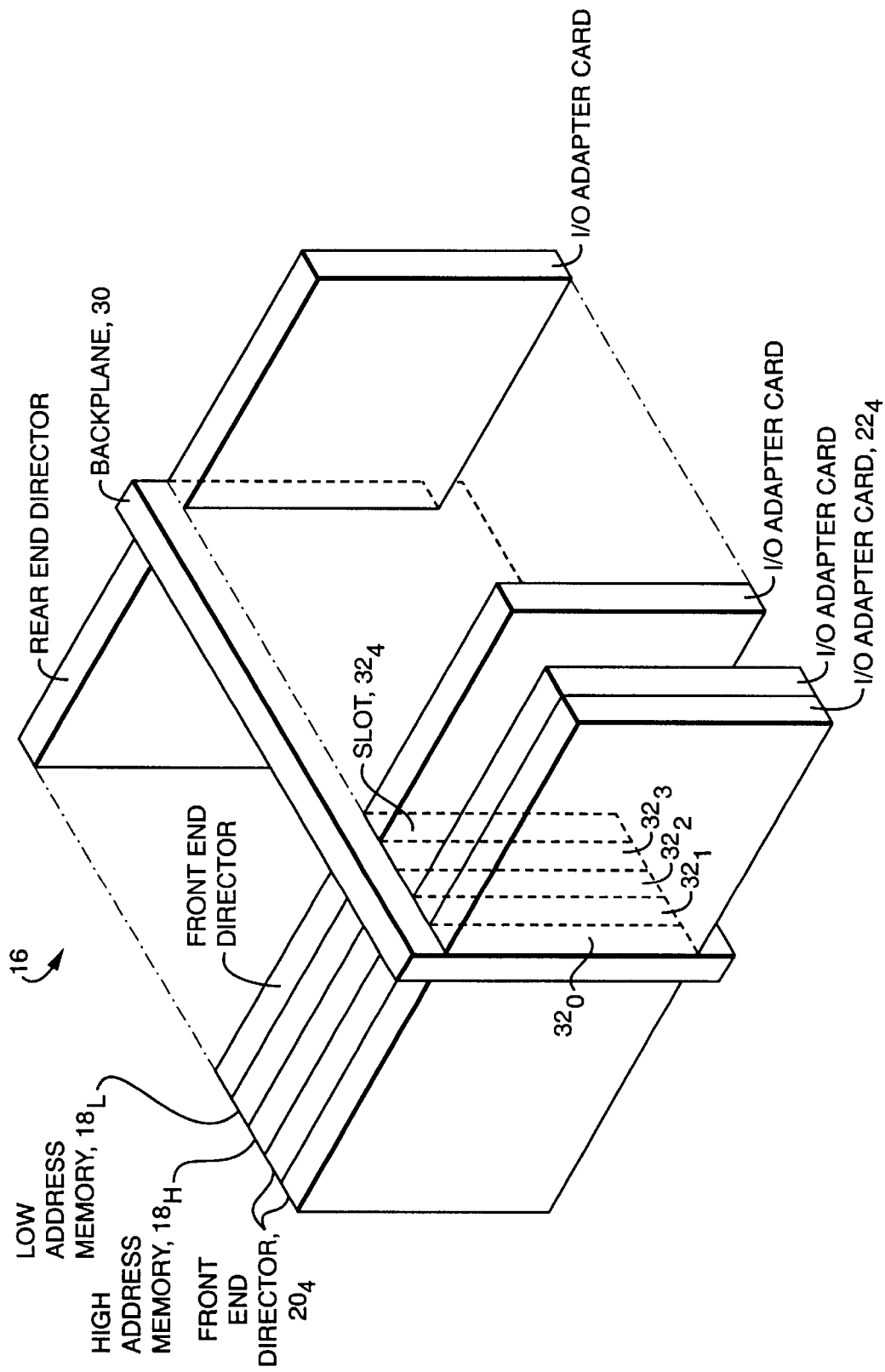
FIG. 6 is an isometric sketch of an interface used in the system of FIGS. 5A and 5B.

More particularly, and referring also to FIG. 6, it is noted that because directors $20_0$–$20_{15}$ are received in one side of the backplane 30 and input/output I/O adapter cards $22_0$–$22_{15}$ are received on the other side of the backplane 30, the "backplane" may be regarded as a "midplane" printed circuit board. That is, the "backplane" has printed circuit boards (i.e., an I/O adapter cards $22_0$–$22_{15}$ and director cards $20_0$–$20_{15}$ (or memory card 18H, 18L) plugged into opposite sides of it.

Figure 7A:
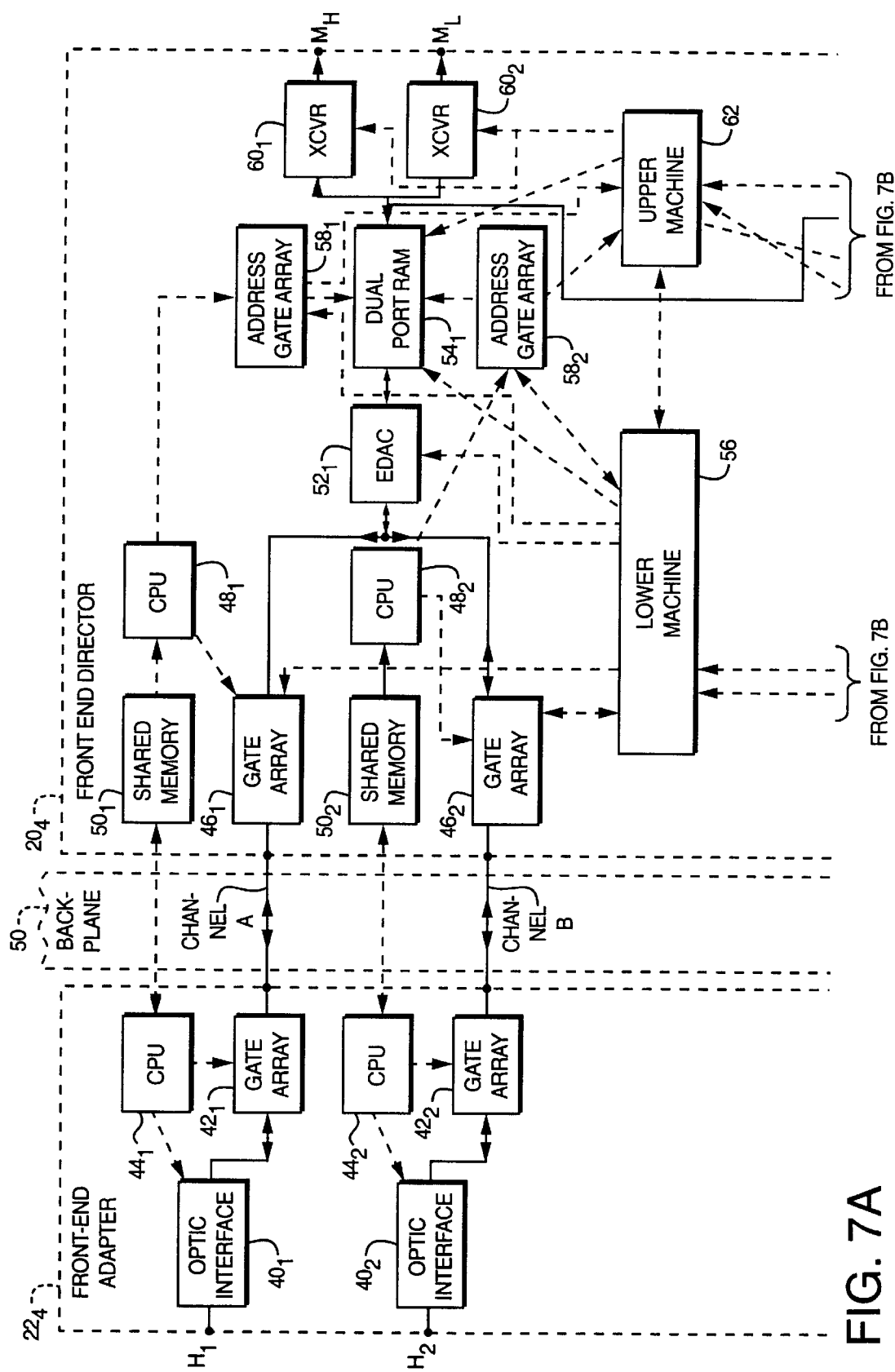
FIGS. 7A and 7B are a block diagram of one of the ESCON front end adapters and one of the front end directors used in the system of FIGS. 5A and 5B in accordance with the invention.
Figure 7B:
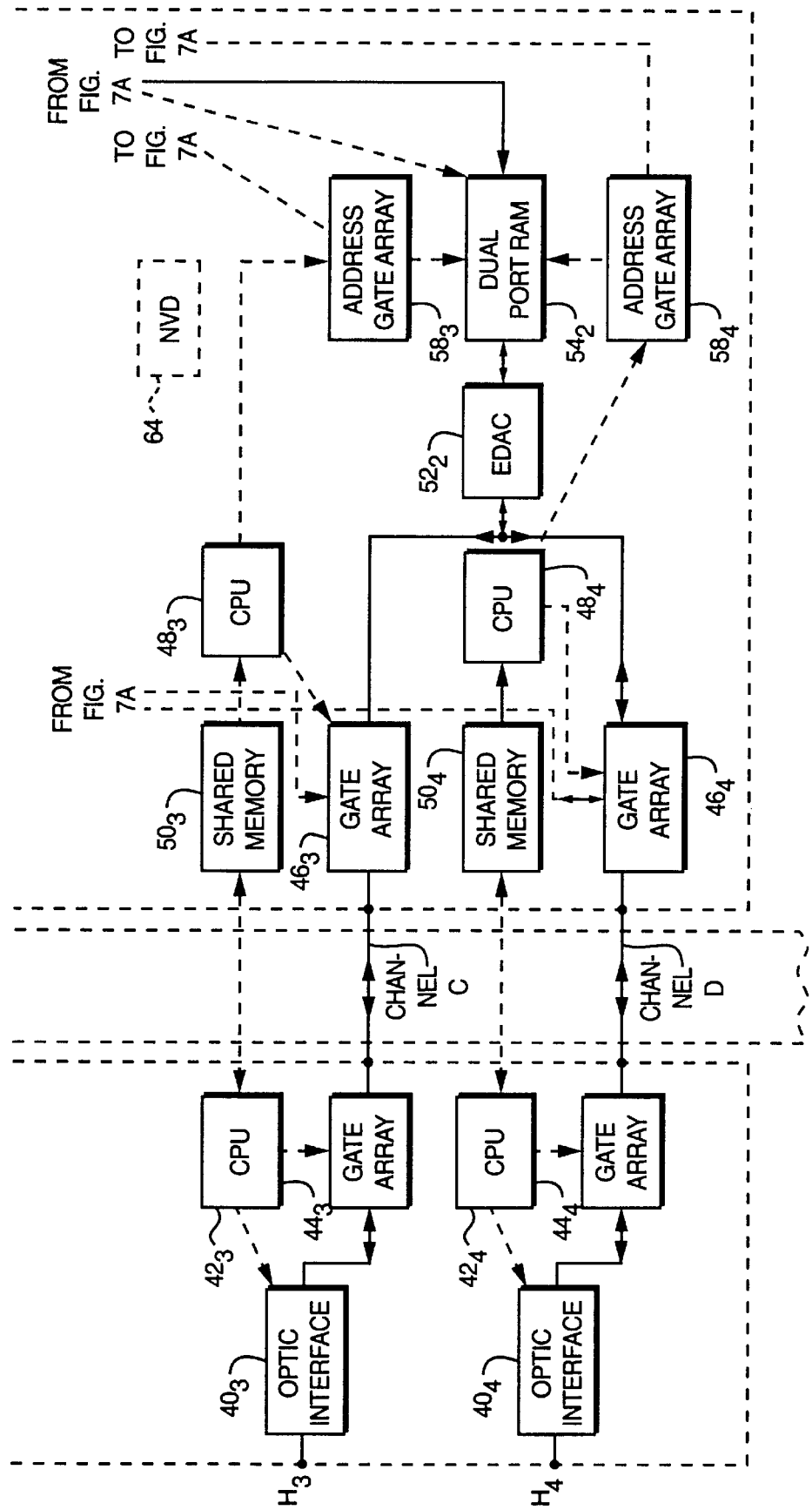

Referring now to FIGS. 7A and 7B, an exemplary one of the front end I/O adapter printed circuit boards, here I/O adapter board $22_4$ and its associated (i.e., coupled) front end director board, here director board $24_4$ are shown in more detail. It is first noted that here the front end I/O adapted board $22_4$ is an ESCON front end adapter board having four ports H1, H2, H3 and H4 adapted for coupling to the host computer. The front end I/O adapter board 204 has four optic interfaces $40_4$, each one being connected to a corresponding one of the four ports H1, H2, H3 and H4. The adapter board $22_4$ also includes four gate arrays $42_1$–$42_4$, each one coupled to a corresponding one of the optic interfaces $40_1$–$40_4$, respectively. The front end adapted printed circuit board $22_4$ also includes four separate CPUs $44_4$, each one controlling a corresponding one of the gate arrays $42_1$–$42_4$, respectively and the one of the optic interfaces $40_1$–$40_4$, respectively, coupled to such corresponding one of the gate arrays $42_1$–$42_4$, as indicated. Thus, four independent (i.e., concurrent) data channels DMA channels, i.e., Channel A, Channel B, Channel C and Channel D, are provided.

The front end director board $20_4$ includes four gate arrays $46_1$–$46_4$, each one being disposed in a corresponding one of the four DMA channels, i.e., Channel A, Channel B, Channel C and Channel D, respectively, as indicated. Each one of the gate arrays $46_1$–$46_4$ is controlled by a corresponding one of four CPUs $48_1$–$48_4$, respectively. Each one of the four CPUs $48_1$–$48_4$ is coupled to a corresponding one of the four CPUs $44_1$–$44_4$, respectively, through a communication path which includes a corresponding one of four shared memories $50_1$–$50_4$, respectively, as indicated.

The front end director board 204 includes a pair of EDACs $52_1$ and $52_2$, one of the EDACs, here EDAC $52_1$ being shared by the gate arrays $46_1$ and $46_2$ in Channels A and B and the other one of the EDACs $52_2$ being shared with the gate arrays $46_3$ and $46_4$ in Channels C and D, as shown. Arbitration for requests for the EDAC $52_1$ from Channels A and B and arbitration for requests for the EDAC $52_2$ from Channels C and D are processed by a common lower machine 56 on the front end director printed circuit board $20_4$. The common lower machine 56 also provides the control signals for the both EDACs $52_1$ and $52_2$.

A pair of dual port RAMs $54_1$, $54_2$ is provided, RAM $54_1$, being coupled to EDAC $52_1$ and RAM $54_2$ being coupled to EDAC $52_2$. The common lower machine 56 controls both dual port RAMs $54_1$ and $54_2$. The initial global memory address for data is supplied to the RAMs $54_1$ and $54_2$ from address gate arrays $58_1$–$58_4$ coupled to the four CPUs $48_1$–$48_4$, respectively, as indicated. Both dual port RAMs $54_1$, $54_2$ are able to communicate with either one of the pair of busses MH, ML though a pair of transceivers $60_1$, $60_2$; transceiver $60_1$ being coupled to bus MH and transceiver $60_2$ being coupled to bus ML. The transceivers $60_1$ and $60_2$ and arbitration for the bus requests from the RAMs $54_1$, $54_2$ is under control of a common upper machine 62, as indicated.

Address Mapping

Figure 8:
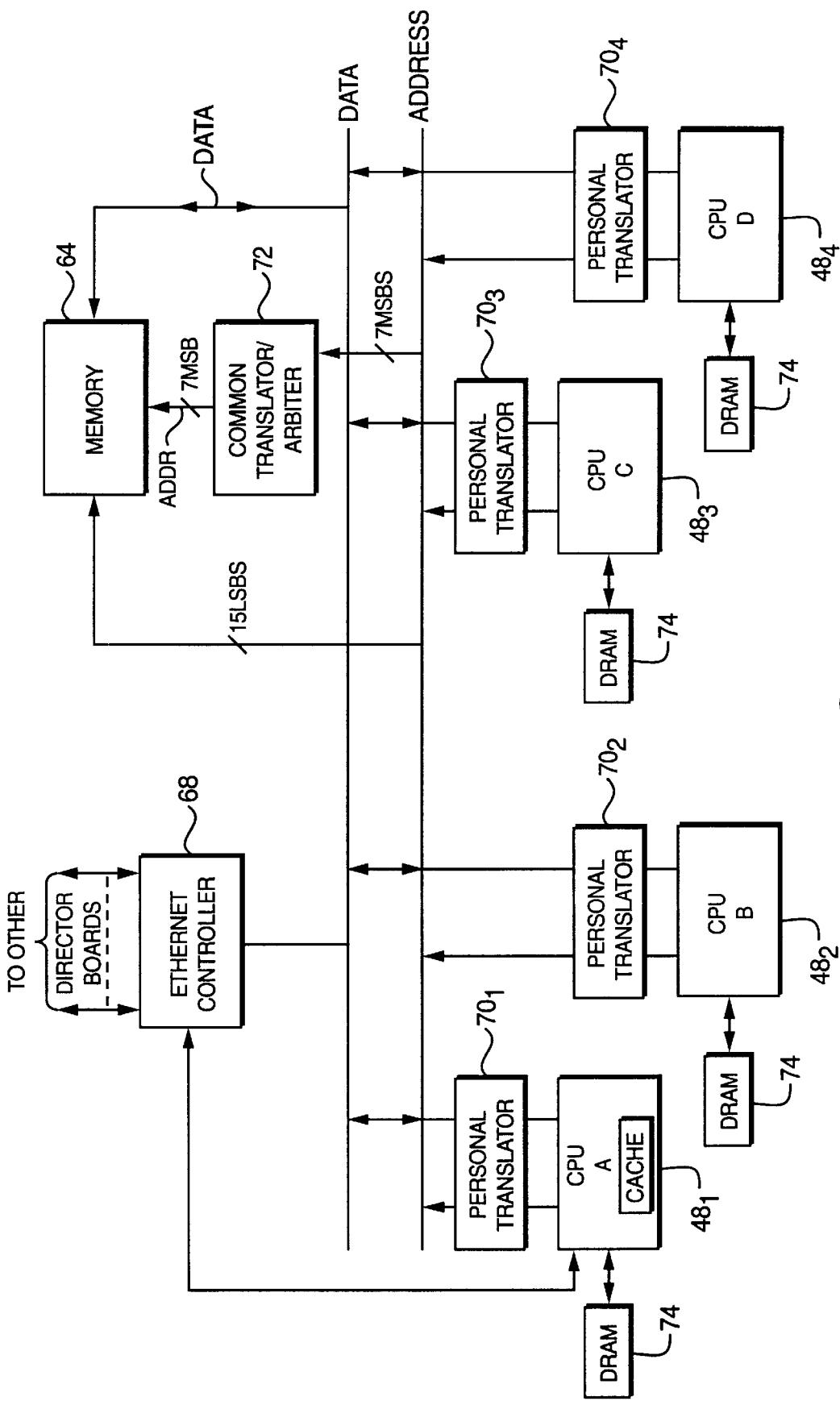
FIG. 8 is a block diagram of a system for enabling processors of the system of FIGS. 7A and 7B having the same software program to transparently access a common memory.

Also included on the director board is a common, shared memory 64, here a non-volatile SRAM. The memory 64 is coupled to the four CPUs $48_1$–$48_4$, as shown more clearly in FIG. 8. In FIG. 8, the four CPUs $48_1$–$48_4$ are also designated as CPU A -CPU D, respectively. It is first noted that the four CPUs A–D are coupled to other director boards in the system via a system Ethernet hub, not shown. Each one of the four CPUs A–D are coupled to DATA and address busses via a corresponding one of four personal address translators $70_1$–$70_4$, respectively, as shown. The data and addresses on the data and addresses busses are fed to the memory 64 via a common translator arbiter 72, as indicated. The details of the arrangement shown in FIG. 8 will be described in connection with FIGS. 9A, 9B and 9C. Suffice it to say here, however, that various messages, such as error messages and interrupts from the other directors may come into an Ethernet controller 68 or may be communicated from this director board to the other directors via the Ethernet controller 68. In any event, considering for example the case where a message is received by the Ethernet controller 68. This message is routed to a master one of the CPUs A–D, here to CPU A. The message is then transferred to a DRAM 74 coupled to the CPU A. It is noted that each one of the CPUs A–d has its own cache memory. Each cache memory stores the same program. One function of the program is to enable the CPU to write data into, or read data from a specific region in the memory 64 designated for that CPU. Thus, referring to FIGS. 9A, 9B and 9C, it is noted that each one of the CPUs has a corresponding region in the memory. Further, it is noted that here the address to the memory is a 23 word. Each one of the CPU regions is designated by the 7 most significant bits (MSBs) of the address presented to the memory 64. Thus, here for example, addresses (i.e., memory locations) having as the 7 MSBs addressees 0–77,fff (hex) are designated as the CPU A memory region; addresses 78,000–ef,fff (hex) are designated as the CPU B memory region, addresses f0,000–167,000 (hex) are designated as the CPU C memory region, and addresses 168,000–1df,fff (hex) are designated as the CPU D memory region. A shared memory region having as the 7 MSBs addresses 1e0,000–1ff,fff (hex) is also provided for reasons to be described.

Thus, as noted briefly above, the program stored in each CPU enables that CPU to write data into or read data from its designated memory region. Further, each CPU may only read data from the memory region designated for the other ones of the CPUs. Further, each CPU may write data into, or read data from the shared memory region.

Figure 10:
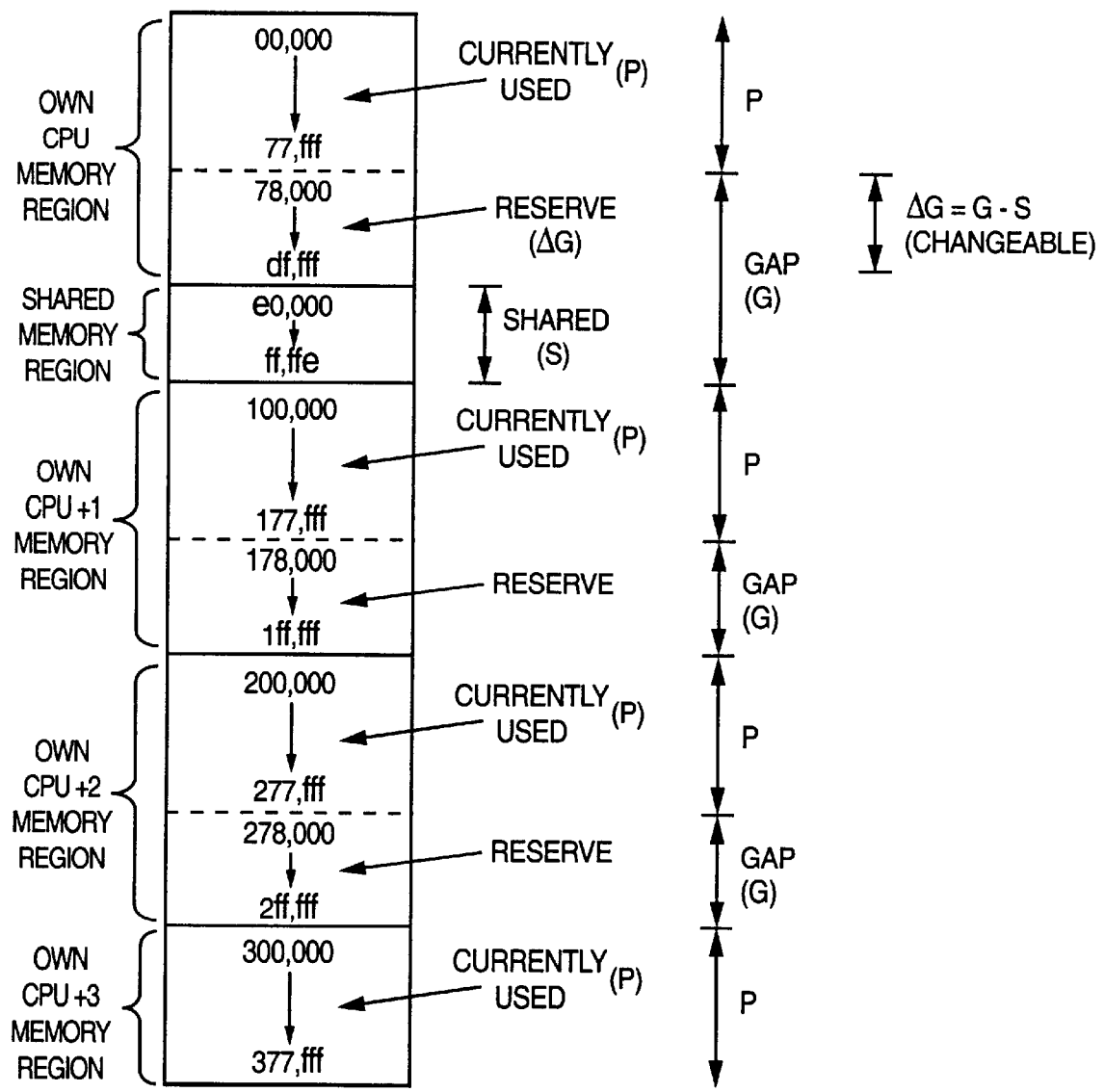
FIG. 10 is a diagram showing the addresses which are provided by a processor used in the system of FIGS. 9A, 9B and 9C.
Figure 11:
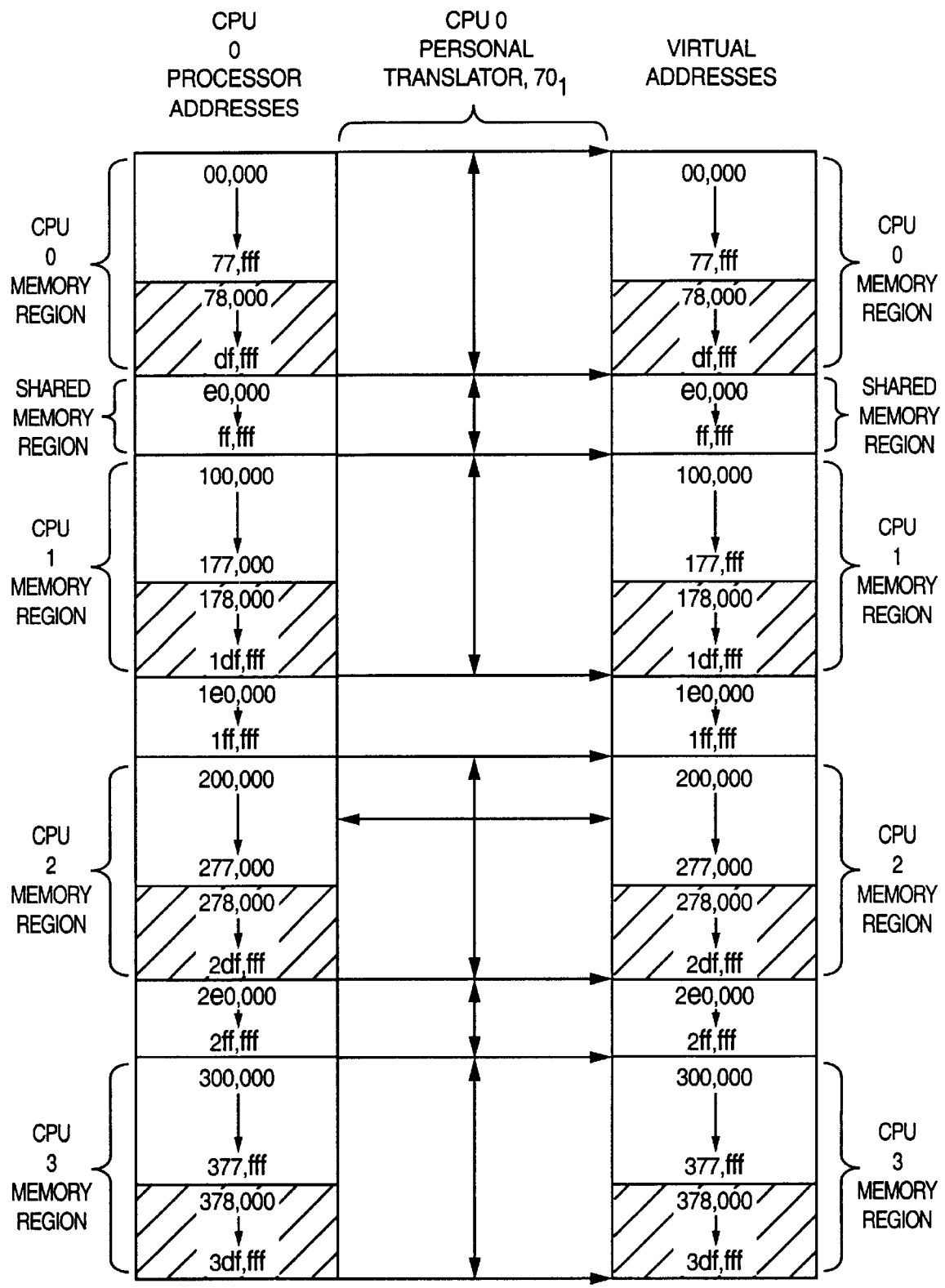
FIGS. 11–14 are diagrams showing the translation (i.e., mapping) of addresses produced by each one of four of the processors, respectively, in the system of FIG. 8 into a common range of virtual addresses.
Figure 12:
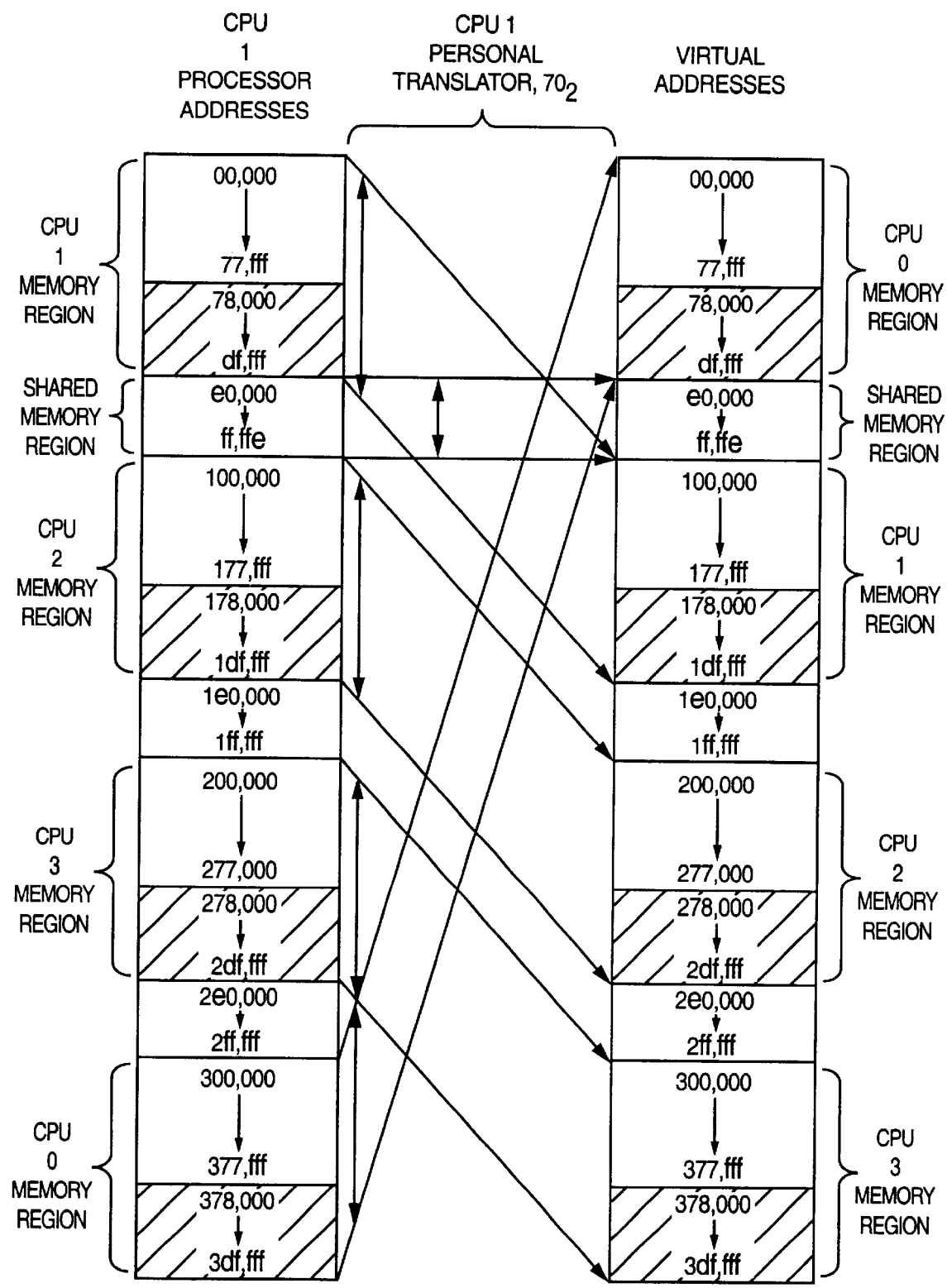
Figure 13:
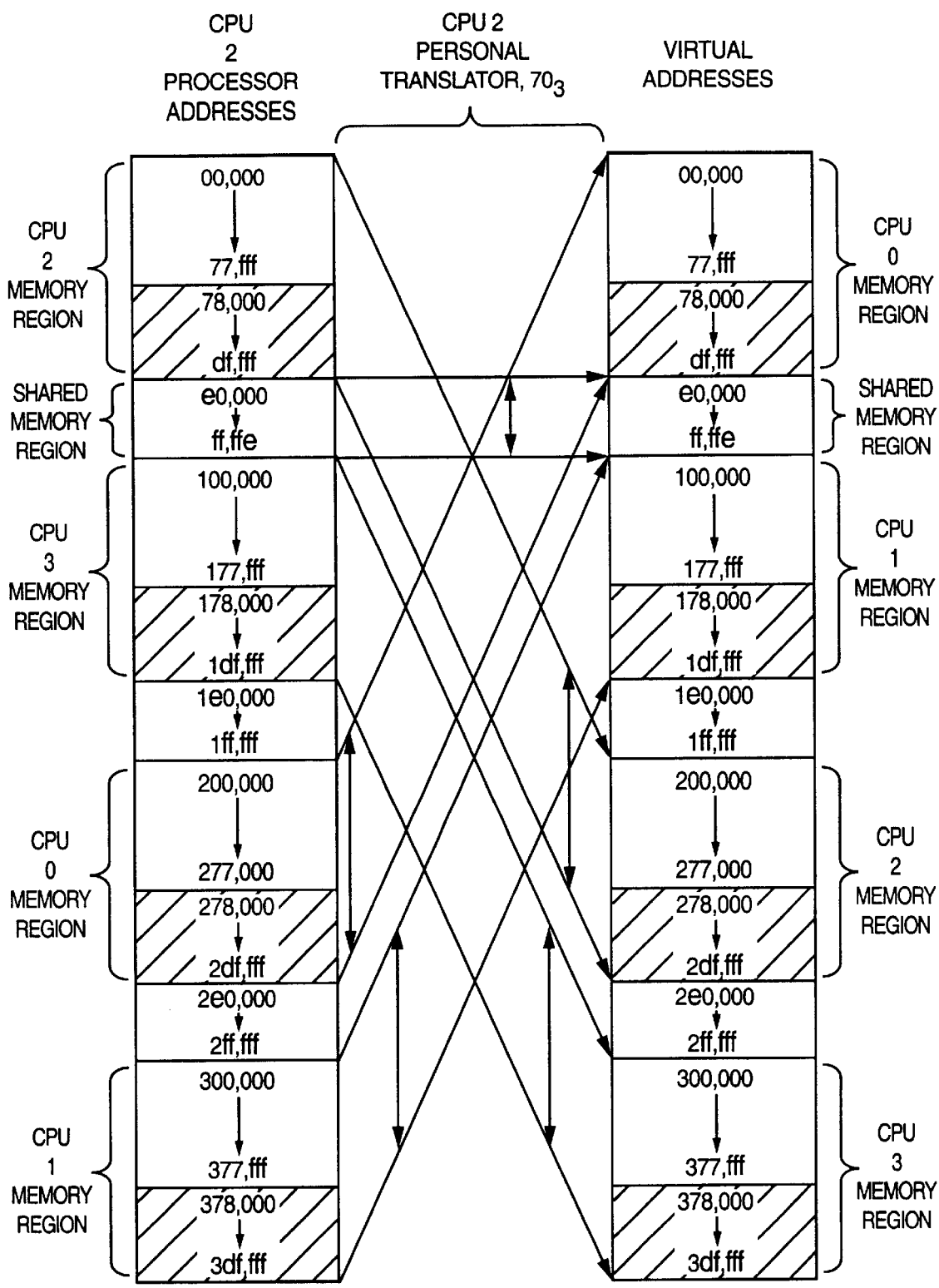
Figure 14:
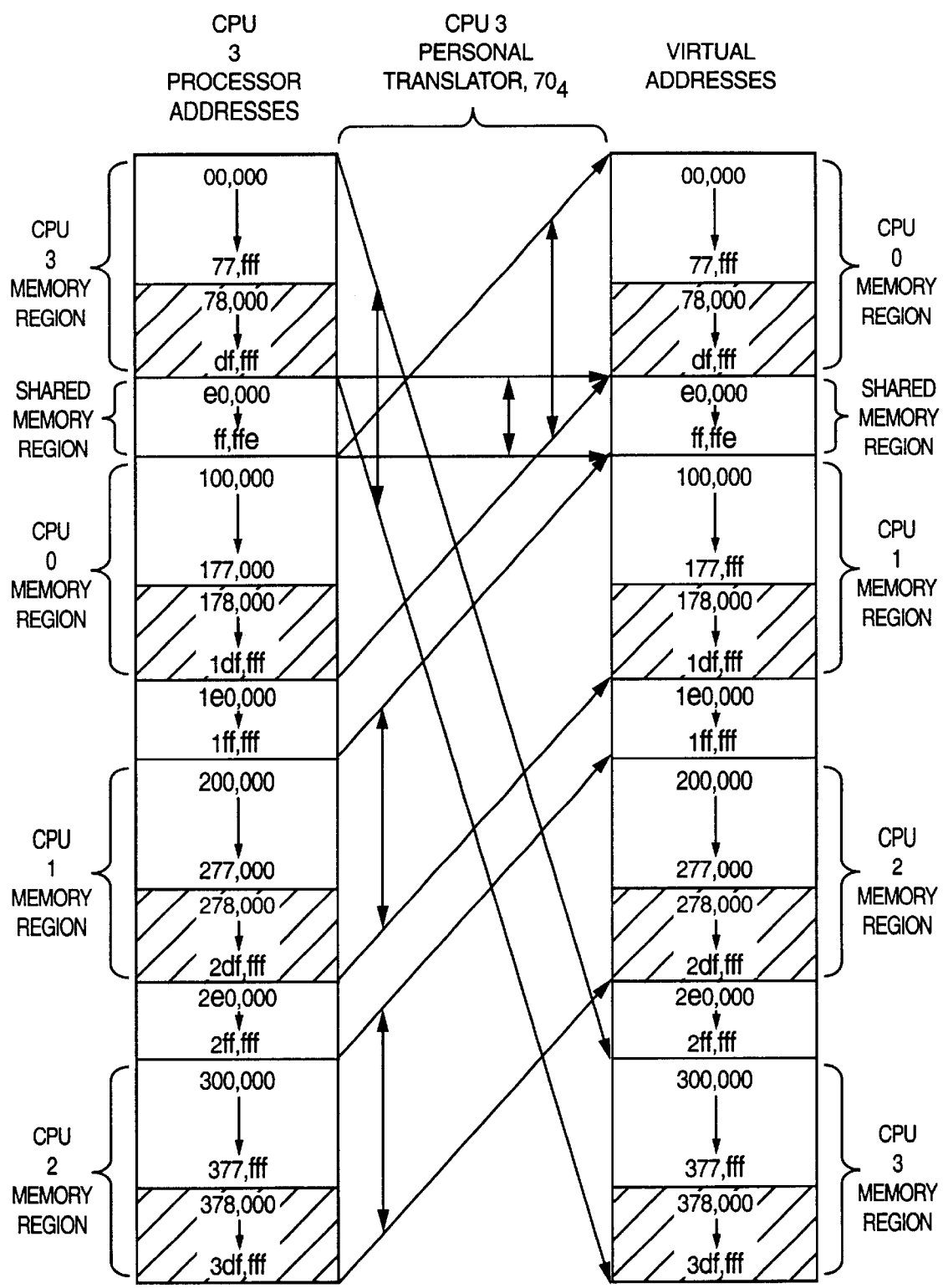

In order for each CPU to store the same program, the addresses produced by any one of the CPUs are in the same range. Here, the range of addresses produced by any one of the CPUs is shown in FIG. 10. Thus, when any one of the CPUs wants to address its own memory region, the program uses address having as the 7 MSBs thereof addresses 00,000–df,fff (hex). If the CPU wants to access the shared memory region it uses addresses having the 7 MSBs e0,000–ff,fff. For convenience let the CPUs A–D be designated as CPU 0–CPU 3, respectively. Thus, if the CPU wanting to access the memory region is "OWN CPU", and such CPU wants to access the CPU "OWN CPU plus 1, the CPU uses addresses 100,000–1ff,fff (hex). If the CPU wanting to access the memory region is "OWN CPU", and such CPU wants to access the CPU "OWN CPU plus 2, the CPU uses addresses 200,000–2ff,ff (hex). If the CPU wanting to access the memory region is "OWN CPU", and such CPU wants to access the CPU "OWN CPU plus 2, the CPU uses addresses 300,000–3ff,fff (hex).

The above is summarized in the Tables below:

TABLE I

CPU A REQUESTS FOR MEMORY

| MEMORY SPACE REQUESTED BY CPU A | CPU A's PRESENTED ADDRESS | VIRTUAL ADDRESS | PHYSICAL ADDRESS |
|---|---|---|---|
| READ/WRITE CPU A's MEMORY LOCATIONS | 0-77,FFF HEX (000 0000- 000 1110,7 MSBs) | 0-77,FFF HEX (000 0000- 000 1110,7 MSBs) | 0-77,FFF HEX (000 0000- 000 1110,7 MSBs) |
| READ/WRITE SHARED MEMORY LOCATIONS | E0,000-FF,FFF HEX (001 1100- 001 1111,7 MSBs) | E0,000-FF,FFF HEX (001 1100- 001 1111,7 MSBs) | 1E0,000-1FF,FFF HEX (011 1100 011 1111,7 MSBs) |
| READ ONLY CPU B's MEMORY LOCATIONS | 100,000-177,FFF HEX (010 0000- 010 1110,7 MSBs) | 100,000-177,FFF HEX (010 0000- 010 1110,7 MSBs) | 78,000-EF,FFF HEX (000 1111 - 001 1101,7 MSBs) |
| READ ONLY CPU C's MEMORY LOCATIONS | 200,000-277,FFF HEX (100 0000 - 100 1110,7 MSBs) | 200,000-277,FFF HEX (100 000 - 100 1110,7 MSBs) | F0,000-167,FFF HEX (001 1110 - 010 1101,7 MSBs) |
| READ ONLY | 300,000-377,FFF | 300,000-377,FFF | 168,000-1D,FFF HEX |

TABLE I-continued

CPU A REQUESTS FOR MEMORY

| MEMORY SPACE REQUESTED BY CPU A | CPU A's PRESENTED ADDRESS | VIRTUAL ADDRESS | PHYSICAL ADDRESS |
|---|---|---|---|
| CPU D's MEMORY LOCATIONS | HEX (110-0000 - 110 1110,7 MSBs) | HEX (110-0000 - 110 1110,7 MSBs) | (010 1101 - 011 1011,7 MSBs) |

TABLE II

CPU B REQUESTS FOR MEMORY

| MEMORY SPACE REQUESTED BY CPU B | CPU B's PRESENTED ADDRESS | VIRTUAL ADDRESS | PHYSICAL ADDRESS |
|---|---|---|---|
| READ/WRITE CPU B's MEMORY LOCATIONS | 0-77,FFF HEX (000 0000 - 000 1110,7 MSBs) | 100,000-177,FFF HEX (010 0000 - 010 1110,7 MSBs) | 78,000-EF,FFF HEX (000 1111 - 001 1101,7 MSBs) |
| READ/WRITE SHARED MEMORY LOCATIONS | E0,000-FF,FFF HEX (001 1100- 001 1111,7 MSBs) | E0,000-FF,FFF HEX (001 1100- 001 1111,7 MSBs) | 1E0,000-1FF,FFF HEX (011 1100- 011 1111,7 MSBs) |
| READ ONLY CPU C's MEMORY LOCATIONS | 100,000-177,FFF HEX (010 0000 - 010 1110,7 MSBs) | 200,000-277,FFF HEX (100 0000 - 100 1110,7 MSBs) | F0,000-167,FFF HEX (001 1110 - 010 1101,7 MSBs) |
| READ ONLY CPU D's MEMORY LOCATIONS | 200,000-277,FFF HEX (100 0000 - 100 1110,7 MSBs) | 300,000-377,FFF HEX (110 0000 - 110 1110,7 MSBs) | 168,000-1D,FFF HEX (010 1101 - 011 1011,7 MSBs) |
| READ ONLY CPU A's MEMORY LOCATIONS | 300,000-377,FFF HEX (110 0000 - 110 1110,7 MSBs) | 0-77,FFF HEX (000 0000 - 000 1110,7 MSBs) | 0-77,FFF HEX (000 0000 - 000 1110,7 MSBs) |

TABLE III

CPU C REQUESTS FOR MEMORY

| MEMORY SPACE REQUESTED BY CPU C | CPU C's PRESENTED ADDRESS | VIRTUAL ADDRESS | PHYSICAL ADDRESS |
|---|---|---|---|
| READ/WRITE CPU C's MEMORY LOCATIONS | 0-77,FFF HEX (000 0000 - 000 1110,7 MSBs) | 200,000-277,FFF HEX (100 0000 - 100 1110,7 MSBs) | F0,000-167,FFF HEX (001 1110 - 010 1101,7 MSBs) |
| READ/WRITE SHARED MEMORY LOCATIONS | E0,000-FF,FFF HEX (001 1110 - 001 1111,7 MSBs) | E0,000-FF,FFF HEX (001 1110 - 001 1111,7 MSBs) | 1E0,000-1FF,FFF HEX (011 1110 - 011 1111,7 MSBs) |
| READ ONLY CPU D's MEMORY LOCATIONS | 100,000- 177,FFF HEX (010 0000 - 010 1110,7 MSBs) | 300,000-377,FFF HEX (110 0000 - 110 1110,7 MSBs) | 168,000- 1D,FFF HEX (010 1101 - 011 1011,7 MSBs) |
| READ ONLY CPU A's MEMORY LOCATIONS | 200,000-277,FFF HEX (100 0000 - 100 1110,7 MSBs) | 0-77,FFF HEX (000 0000 - 000 1110,7 MSBs) | 0-77,FFF HEX (000 0000 - 000 1110,7 MSBs) |
| READ ONLY CPU B's MEMORY LOCATIONS | 300,000-377,FFF HEX (110 0000 - 110 1110,7 MSBs) | 100,000-177,FFF HEX (010 0000 - 010 1110,7 MSBs) | 78,000-EF,FFF HEX (000 1111 - 001 1101,7 MSBs) |

TABLE IV

CPU D REQUESTS FOR MEMORY

| MEMORY SPACE REQUESTED BY CPU D | CPU D's PRESENTED ADDRESS | VIRTUAL ADDRESS | PHYSICAL ADDRESS |
|---|---|---|---|
| READ/WRITE CPU D's MEMORY LOCATIONS | 0-77,FFF HEX (000 0000 - 000 1110,7 MSBs) | 300,000-377,FFF HEX (110 0000 - 110 1110,7 MSBs) | 168,000-1D,FFF HEX (010 1101 - 011 1011,7 MSBs) |
| READ/WRITE SHARED MEMORY LOCATIONS | E0,000-FF,FFF HEX (001 1110 - 001 1111,7 MSBs) | E0,000-FF,FFF HEX (001 1110 - 001 1111,7 MSBs) | 1E0,000-1FF,FFF HEX (011 1110 - 011 1111,7 MSBs) |
| READ ONLY CPU A's MEMORY LOCATIONS | 100,000-177,FFF HEX (010 0000 - 010 1110,7 MSBs) | 0-77,FFF HEX (000 0000 - 000 1110,7 MSBs) | 0-77,FFF HEX (000 0000 - 000 1110,7 MSBs) |
| READ ONLY CPU B's MEMORY LOCATIONS | 200,000-277,FFF HEX (100 0000 - 100 1110,7 MSBs) | 100,000-177,FFF HEX (010 0000 - 010 1110,7 MSBs) | 78,000-EF,FFF HEX (000 1111 - 001 1101,7 MSBs) |
| READ ONLY CPU C's MEMORY LOCATIONS | 300,000-377,FFF HEX (110 0000 - 110 1110,7 MSBs) | 200,000-277,FFF HEX (100 0000 - 100 1110,7 MSBs) | F0,000-167,FFF HEX (001 1110 - 010 1101,7 MSBs) |

Figure 9B:
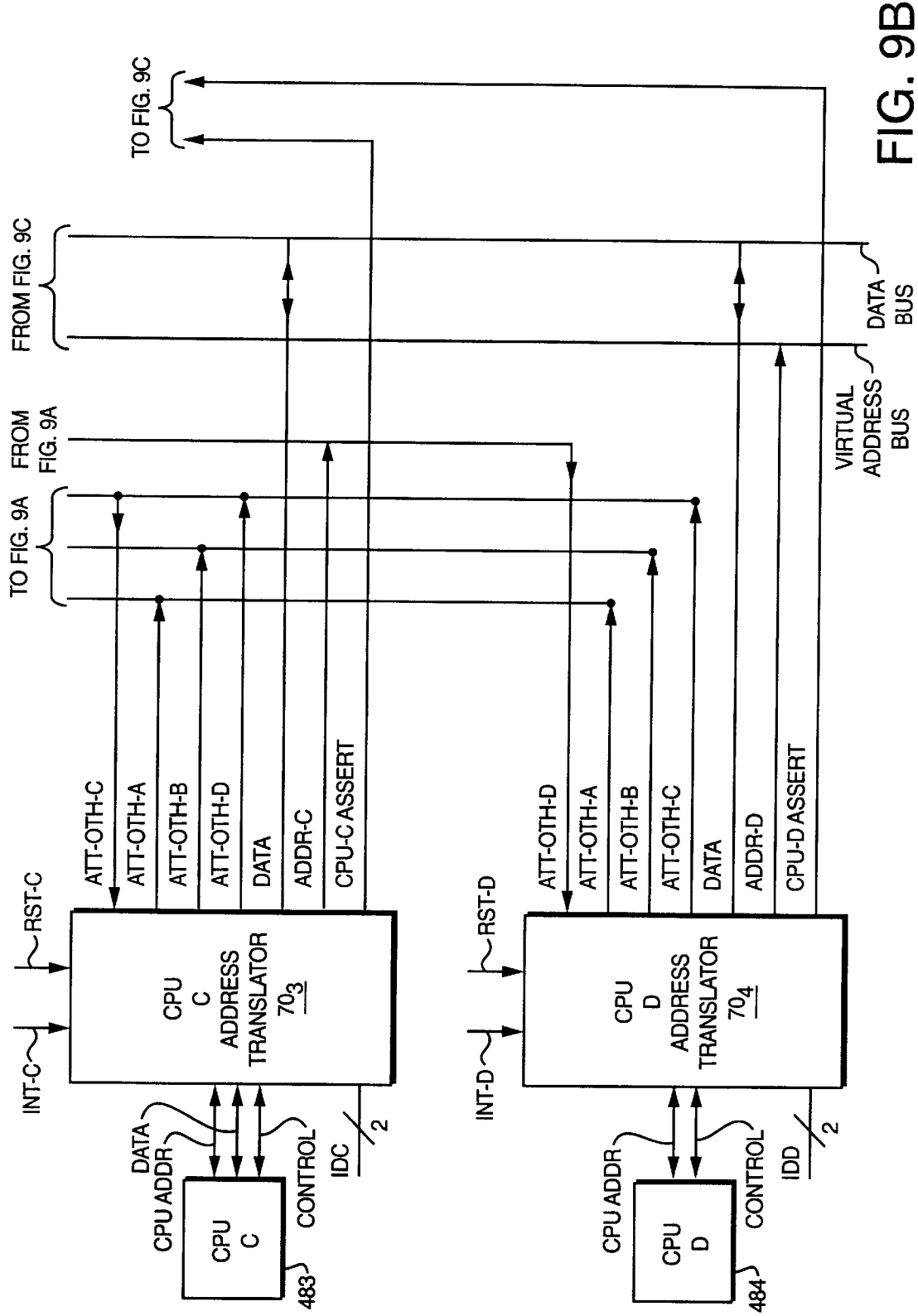
Figure 9C:
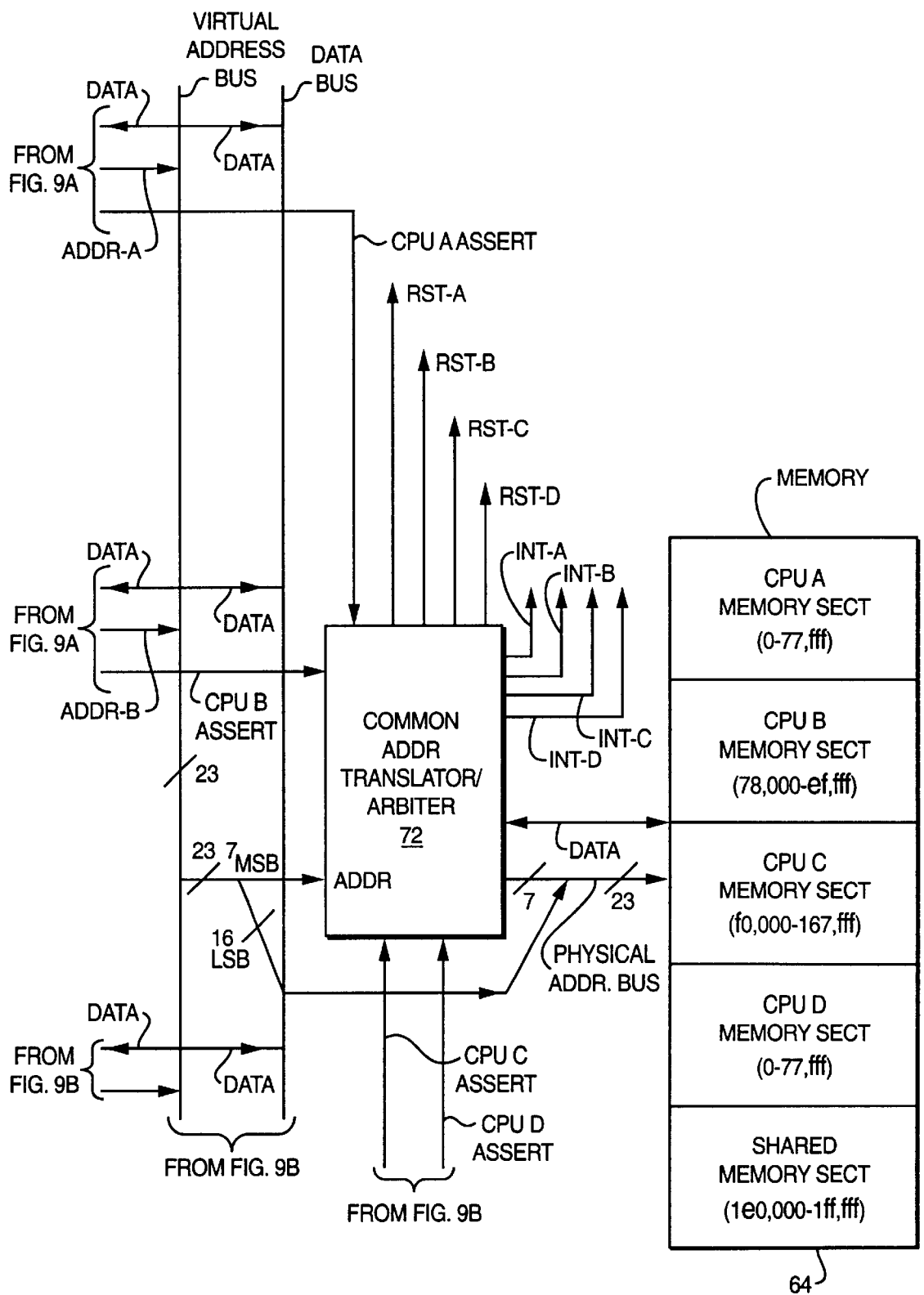

It is next noted that as shown in FIGS. 9A, 9B and 9C, it is desired that the CPU memory regions and the shared memory region be contiguous. That is, it is desired that the memory region from 0–1f,fff be used for storage of data from the four CPUs A–D. However, referring also to FIG. 10, it is noted that here only a portion of the available addresses for each CPU are actually used. For example, while address from 00,000–df,fff are available for "OWN CPU", here only addresses 00,000–77,fff (hex) are actually used. Addresses 78,000–df,fff (hex) are reserved for further expansion. Thus, the currently used addresses are designated as (p) in FIG. 10 and the reserved, unused, addresses are designated as (ΔG). The addresses used by the shared memory region are designates by S. It should be noted therefore, that there is a gap, G, between the last used address for one CPU and the first address used by the next CPU.

FIGS. 11–14 shown the addresses used, i.e., actually produced) by each of the four CPUs A–D, respectively and the physical memory region to be addressed by such CPU produced addresses. That is, the addresses produced by the CPU are referred to as processor addresses and the addresses actually presented to the memory 64 (FIG. 8) are referred to as memory address (or physical addresses). Reference is again made to the Tables presented above.

The process of mapping the processor addresses produced by the CPUs A–D into physical memory addresses is shown in FIG. 15. It is noted that the mapping is a two step process: First, the address produced by the CPU is translated to a virtual address by the personal translator (FIG. 8) coupled to the CPU issuing the address. Second, then the virtual address is translated to the physical address by the common translator/arbiter 72 (FIG. 8).

Thus, the translators map the processor addresses fed thereto to virtual addresses,. The virtual addresses have a plurality of sets of virtual address regions, each virtual address region corresponding to one of the processor memory regions, as shown in FIGS. 11–14 for personal translators $70_1$–$70_4$, respectively. As shown in such FIGS. 11–14, the virtual addresses have MSBs from 00,000–3df,ff (hex). It is noted, for that each one of the personal translators:

(A) the virtual addresses in the set from 00,000–df,fff are for the CPU A (i.e., CPU 0) memory region, although only address 00,000–77,fff are used and addressees 78,000–ff,fff are reserved, i.e., currently unused;

(B) the virtual addresses in the set from 100,000–1df,fff are for the CPU B (i.e. CPU 1) memory region, although only address 100,000–177,fff are used and addressees 178,000–1ff,fff are reserved, i.e., currently unused;

(C) the virtual addresses in the set from 200,000–2df,fff are for the CPU C (i.e., CPU 2) memory region, although only address 200,000–277,fff are used and addressees 278,000–2ff,fff are reserved, i.e., currently unused;

(D) the virtual addresses in the set from 300,000–3df,fff are for the CPU D (i.e. CPU 3) memory region, although only address 300,000–377,fff are used and addressees 378,000–3ff,fff are reserved, i.e., currently unused.

Thus, the personal translators map the set of processor addresses corresponding to the same processor memory region to the corresponding one of the sets of virtual address regions.

It is noted that the shared memory addresses produced by the CPUs A–D are in addresses e0,000–ff,fff are translated to the same virtual addresses by the personal translators, as shown in FIGS. 11–14.

Here, the translation, or mapping, by the personal translators is performed by adding: binary 00 to the two MSBs of the 7 MSBs address produced by CPU A; binary 01 (i.e., 100,000 hex) to the two MSBs of the 7 MSBs address produced by CPU B for all addresses (except the addresses for the shared memory, i.e., addresses e0,000–ff ,fff); binary 10 (i.e., 200,000 hex) to the two MSBs of the 7 MSBs address produced by CPU C for all addresses except the addresses for the shared memory, i.e., addresses e0,000–ff, fff); and binary 11 (i.e., 300,000 hex) to the two MSBs of the 7 MSBs address produced by CPU D for all addresses except the addresses for the shared memory, i.e., addresses e0,000–ff,fff), as shown in FIG. 15.

The common address translator/arbiter 72 is fed by the virtual addresses. The common address translator/arbiter 72 maps the virtual addresses fed thereto to the physical memory addresses as shown in FIGS. 15 and 16. The mapping is in accordance with the gap G (FIG. 10) to map each one of the sets of used processor addresses provided by each of the processors (i.e., CPUs) into the corresponding one of the contiguous processor memory regions. Thus, the memory 64 has a plurality of contiguous memory regions:

(A) CPU 0 (i.e., CPU A) region having the 7 MSBs from 00,000–77,fff;
(B) CPU 1 (i.e., CPU B) region having 7 MSBs from 78,000–ef,ff;
(C) CPU 2 (i.e., CPU C) region having 7 MSBs from f0,000–167,fff; and
(D) CPU 3 (i.e., CPU D) region having 7 MSBs from 168,000–1df,00.

There is also a contiguous shared memory region having 7 MSBs from 1e0,000–1ff,fff.

Figure 15A:
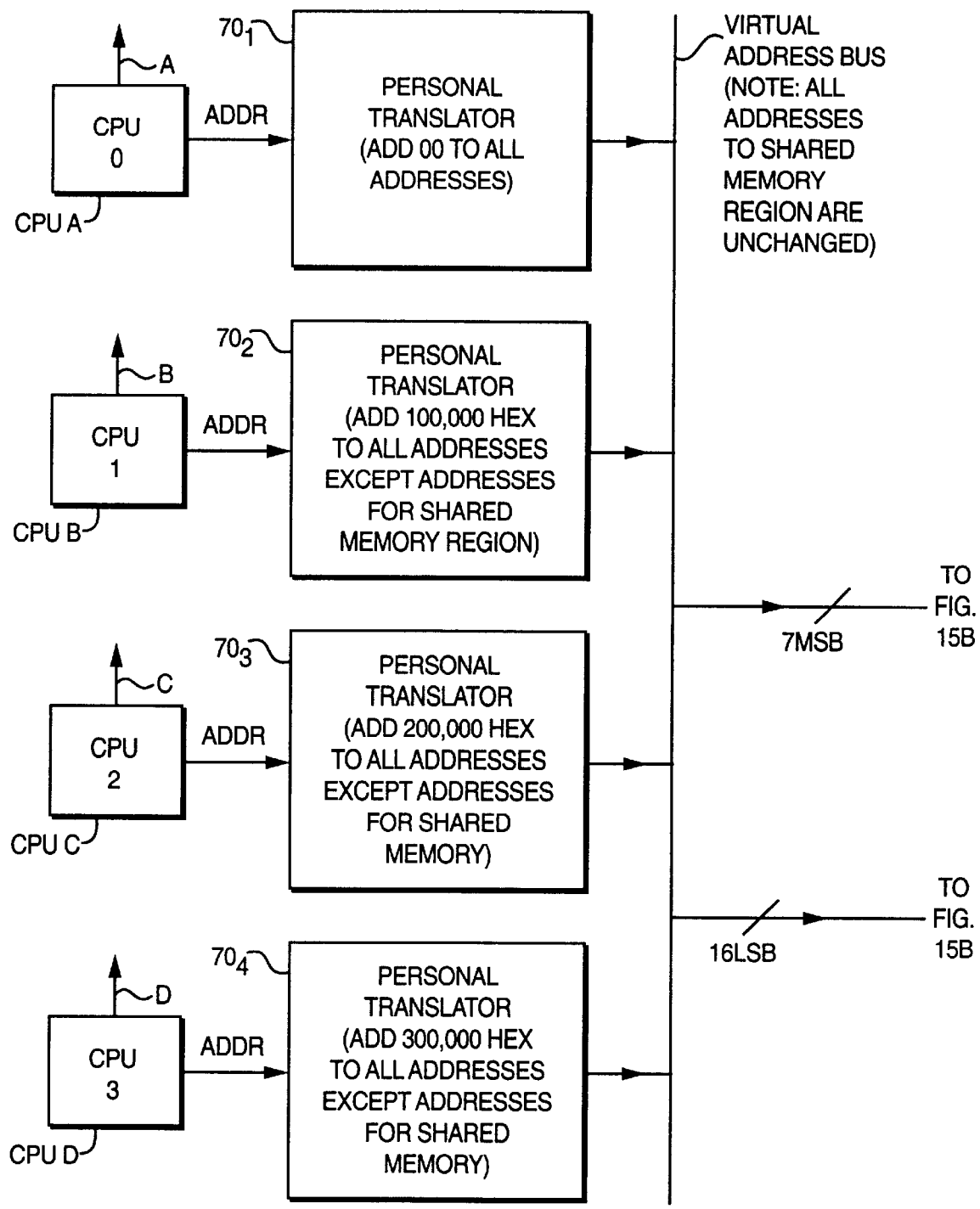
FIG. 15 is a diagram showing the relationship between FIGS. 15A and 15B which together is block diagram of a system for mapping showing of addresses produced by each one of four of the processors, respectively, in the system of FIG. 8 into a common range of virtual addresses by a corresponding personal address translator and a common translator for mapping the virtual addresses into contiguous address in the shared common memory of FIG. 8.
Figure 15B:
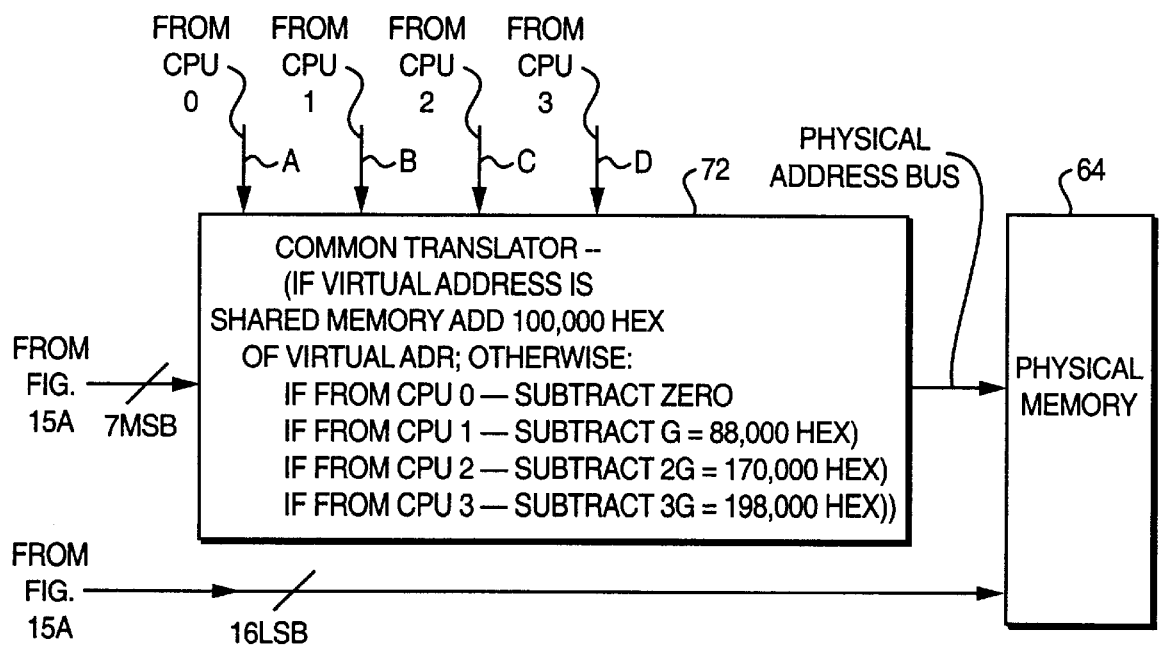
Figure 16:
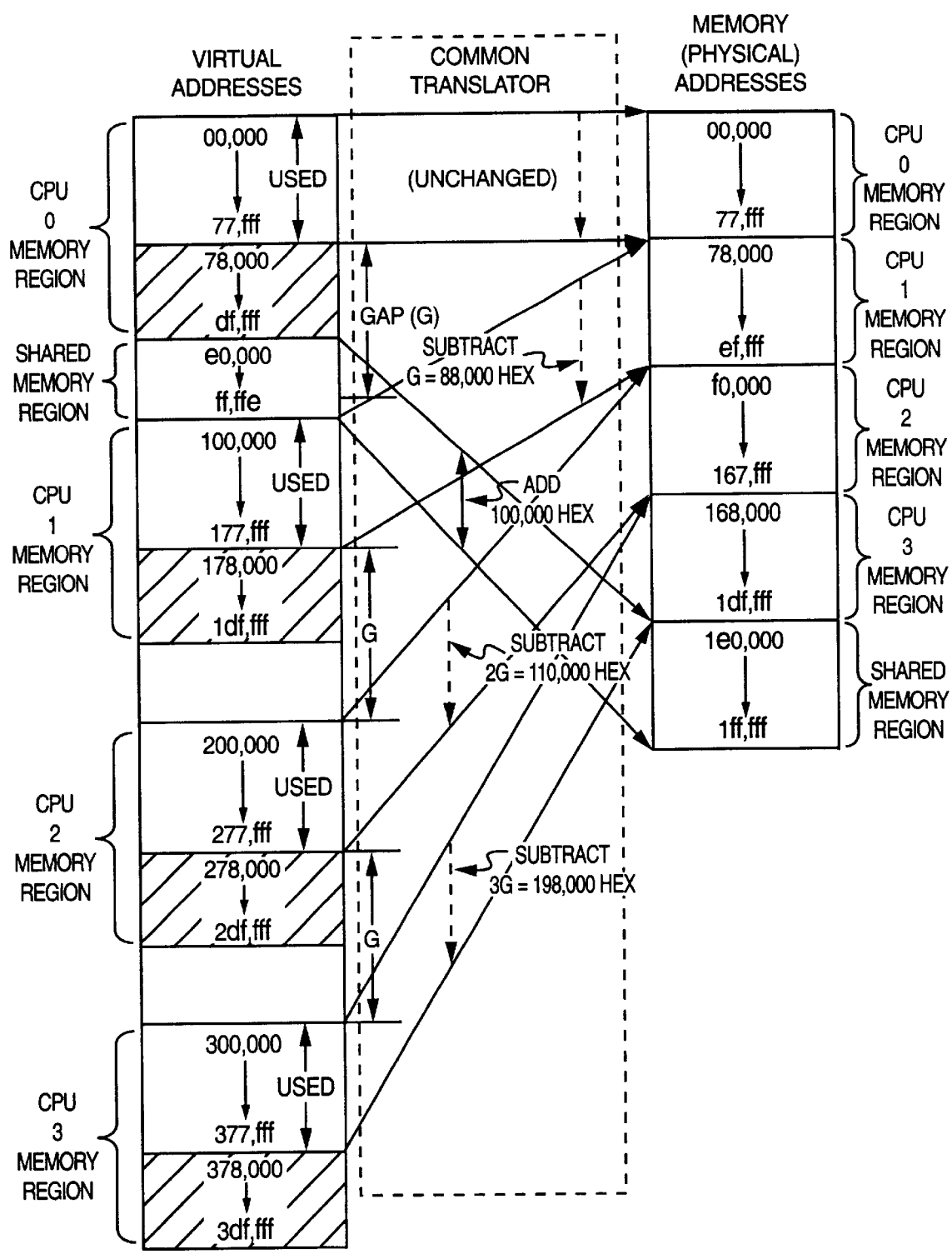
FIG. 16 is a diagram showing the mapping of the virtual addresses of FIGS. 11–14 into contiguous physical address for the common memory.

It is noted that each one of the four CPUs A, B, C and D must make a request for the common translator 72 (FIGS. 15, 15A and 15B). These requests are made by CPUs A–D on request lines A–D, respectively, as indicated in FIGS. 15. 15A and 15B. The arbiter grants the request in accordance with any suitable algorithm, such as "first-come, first-served".

The process provided by the common translator/arbiter is shown in FIG. 15 and is summarized as follows:
(A) If the virtual address is the address for the shared memory region (i.e., the addresses presented to the common translator/arbiter are in the range from 1e0, 000 to1ff,fff), a binary 010 000 (i.e., 100,000 hex) is added to the virtual address regardless of the CPU requesting the common translator/arbiter 72;
(B) If the CPU A is granted access to the common translator/arbiter 72, the common translator/arbiter subtracts 0 from the virtual address;
(C) If the CPU B is granted access to the common translator/arbiter 72, the common translator/arbiter subtracts 88,000 (hex) from the virtual address; and
(D) If the CPU C is granted access to the common translator/arbiter 72, the common translator/arbiter subtracts 110,000 (hex) from the virtual address.

Theses address translation or mapping processes are summarized in the four Tables described above for processor addresses produced by each of the four CPUs, CPU A–CPU D.

The virtual addresses mapped by the common translator/arbiter 72 (FIG. 15 are the physical memory addresses presented to the memory 64, as shown in FIG. 16.

Thus, in summary, the personal translators $70_1$–$70_4$ (FIG. 8) map the addresses (i.e., processor addresses) produced by its CPU (i. e., CPU A–CPU D, respectively) into a common range of addresses (i.e., the virtual addresses). The common translator/arbiter 72 converts the used addresses P (FIG. 10) into a series of contiguous physical addresses in the memory 64 (i.e., addresses without gaps, G, FIG. 10) as shown in FIG. 16.

Reset Other, Attention Other, Interrupt Other

Referring now again to FIGS. 9A, 9B and 9C, it is noted that each one of the CPUs A–D may issue an attention other (ATT_OTH) command to any other one of the CPUs A–D in a uni-cast mode of operation, or may issue such command to all the other CPUs A–D in a broadcast mode of operation. Further, the common address translator/arbiter may issue an interrupt command (INT) at the request of one of the CPUs A–D to any other one of the CPUs A–D in a uni-cast mode of operation, or may issue such command to all CPUs A–D in a broadcast mode of operation. Still further, the common address translator/arbiter may issue a reset command (RST) at the request of one of the CPUs A–D to any other one of the CPUs A–D in a uni-cast mode of operation, or may issue such command to all the other CPUs A–D in a broadcast mode of operation.

More particularly, and referring again to FIGS. 9A, 9B and 9C, each one of the personal address translators $70_1$–$70_4$ is fed with a two bit binary code, here a two bit voltage level on each of a two line bus IDA, IDB, IDC and IDD, respectively, as shown, to thereby provide each one of the translators $70_1$–$70_4$, respectively, with a unique, personal translator ID code. Thus, here the two bit code on buses IDA, IDB, IDC and IDD are: 00, 01, 10, and 11, respectively. Further, each one of the personal address translators $70_1$–$70_4$ has three ATT_OTH output lines for transmitting an attention other signal to one, or all, of the other personal address translators $70_1$–$70_4$ and one ATT_OTH input line for receiving an attention other signal from one of the other personal address translators $70_1$–$70_4$. Thus, there are four attention other lines. i.e., ATT_OTH_A, ATU_OTH_B, ATT_OTH_C, and ITO_OTH_D. The line ATT_OTH_A is the attention other input line to personal address translator $70_1$. The line ATT_OTH_A is connected to the attention other outputs lines ATT_OTH_A of personal address translators $70_2$–$70_4$ in an open-collector configuration. More particularly, the line ATT_OTH_A is coupled to a+V voltage source through a pull-up resistor, R. Thus, in an idle state, the personal address translators $70_2$–$70_3$ produce a "high" (+) voltage on the line ATT_OTH_A thereby producing a "high" voltage on the line ATT_OTH_A. However, if any one of the personal translators $70_2$–$70_4$ (at the request of the CPU B-D, respectively, coupled thereto) issues an attention other command for CPU A, whether in a uni-cast mode just to CPU A or to all other CPUs in a broadcast mode, such CPU issuing the attention other command drives its output ATT_OTH_A line towards ground (i.e., "low"), thereby placing a "low" signal on the ATT_OTH_A line to indicate to the personal translator $70_1$ that there is an attention command for the CPU A.

In like manner, the line ATT_OTH_B is the attention other input line to personal address translator $70_2$. The line ATT_OTH_B is connected to the attention other outputs lines ATT_OTH_B of personal address translators $70_1$ and $70_{3-70_4}$ in an open-collector configuration. More particularly, the line ATT_OTH_B is coupled to a+V voltage source through a pull-up resistor, R. Thus, in an idle state, the personal address translators $70_2$–$70_3$ produce a "high" (+) voltage on the line ATT_OTH_B thereby producing a "high" voltage on the line ATT_OTH_B. However, if any one of the personal translators $70_1$, $70_{3-70_4}$ (at the request of the CPU A, or C–D, respectively, coupled thereto) issues an attention other command for CPU B, whether in a uni-cast mode just to CPU B or to all other CPUs in a broadcast mode, such CPU issuing the attention other command drives its output ATT_OTH_B line towards ground (i.e., "low"), thereby placing a "low" signal on the ATT_OTH_B line to indicate to the personal translator $70_2$ that there is an attention command for the CPU B. The other ATT_OTH_C and ATT_OTH_D lines are connected in like manner.

Figure 17:
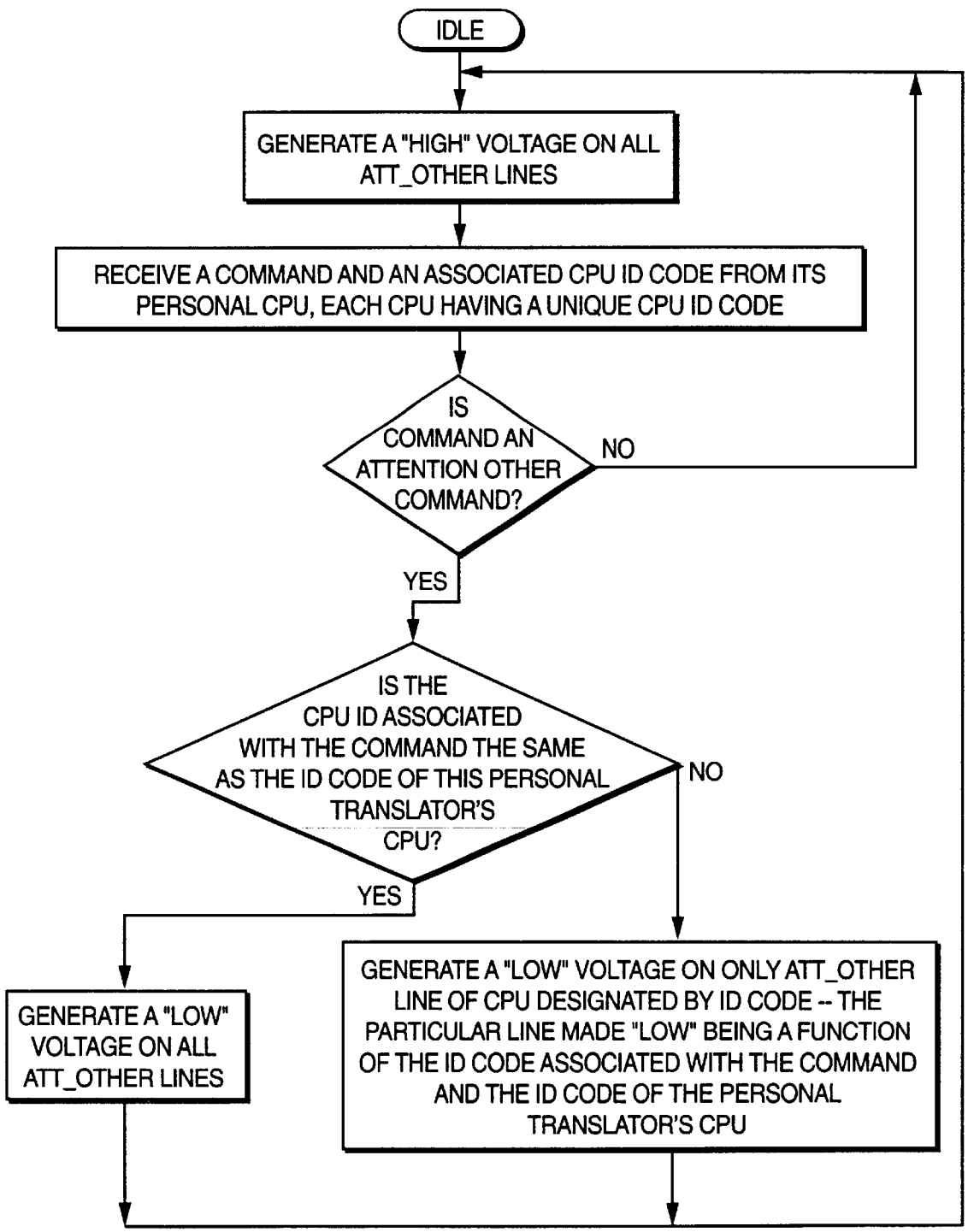
FIG. 17 is a flow diagram of a program stored in each of the personal translators to generate uni-cast mode or broadcast mode attention other commands.

It is noted that each one of the personal translators $70_1$–$70_4$ stores the same program to execute the attention other commands. The flow diagram of such program is shown in FIG. 17. As noted above, each one of the personal translators $70_1$–$70_4$ is fed with a unique two bit ID code which identifies it, and hence the CPU it is coupled to. Further, when a personal translator issues an attention other command at the request of the CPU it is coupled to, such attention other command has an ID code. The ID code is a two bit code. The ID code is associated with the command; however, the ID code and the command are not issued concurrently. Rather, the command is issued and then stored in a register. Subsequently, and not necessary sequentially, the ID) code associated with the command is issued and stored in another register. In any event, if the two bit code is the same as the ID code of that particular personal translator, such translator issues an attention other command to all the other CPUs via their personal translators in a broadcast mode. If, on the other hand, the ID code associated with the command is not the ID code of the issuing CPU (i.e., is not the same as the two bit code fed to the personal translator issuing the attention other command) the attention other issued command is sent only to the personal translator having the ID code in the command in a uni-cast mode.

For example, if the CPU B issues an attention other command for CPU A, the CPU B issues the attention other command and the ID code for CPU A, here the code 00. The personal translator $70_2$ had in the prior idle state (FIG. 16) generated "high" voltages on its attention other output lines, i.e., ATT_OTH_A, ATT_OTH_C and ATT_OTH_D, FIGS. 9A, 9B and 9C). Once it receives the command from CPU B, the personal translator $70_2$ determines whether the command is an attention other command. If it isn't, it returns to the idle state. On the other hand, if it determines that the command is an attention other command, the personal translator $70_2$ test whether the command was associated with the same ID code as the CPU B, here 01, or with some other ID code. i.e., 00, 10 or 11. If the ID code associated with the command is the same as the ID code of the personal translator's CPU, here the same as CPU B, 01, all the attention other lines ATT_OTH_A, ATT_OTH_C and ATT_OTH D) of the translator $70_2$ are driven "low" to thereby transmit an attention other command to all the other CPUs (i.e., CPU A, CPU C and CPU D) in a broadcast mode. If, on the other hand, the ID code with the command is not the same as the ID code of CPU b, in this case. i.e., an ID code 00, or an ID code 10 or an ID code 11), the personal translator $70_2$ drives only one of the attention other output lines (either line ATT_OTH_A, or line ATT_OTH_C or line ATT_OTH_D) "low". The particular one of the attention other output lines driven "low" being a function of the ID code in the command. Thus, if the ID code with the command is 00, line ATT_OTH_A is driven "low". If the ID code with the command is 10, line ATT_OTH_C is driven "low". If the ID code with the command is 11, line ATT_OTH_D is driven "low".

Thus, each personal translator is able to make low one or all of the attention other output lines thereof in accordance with the ID code of that particular translator (which is personalized by the unique two bit code on busses IDA, IDB, IDC and IDD) and the ID code associated with the attention other command.

Figure 18:
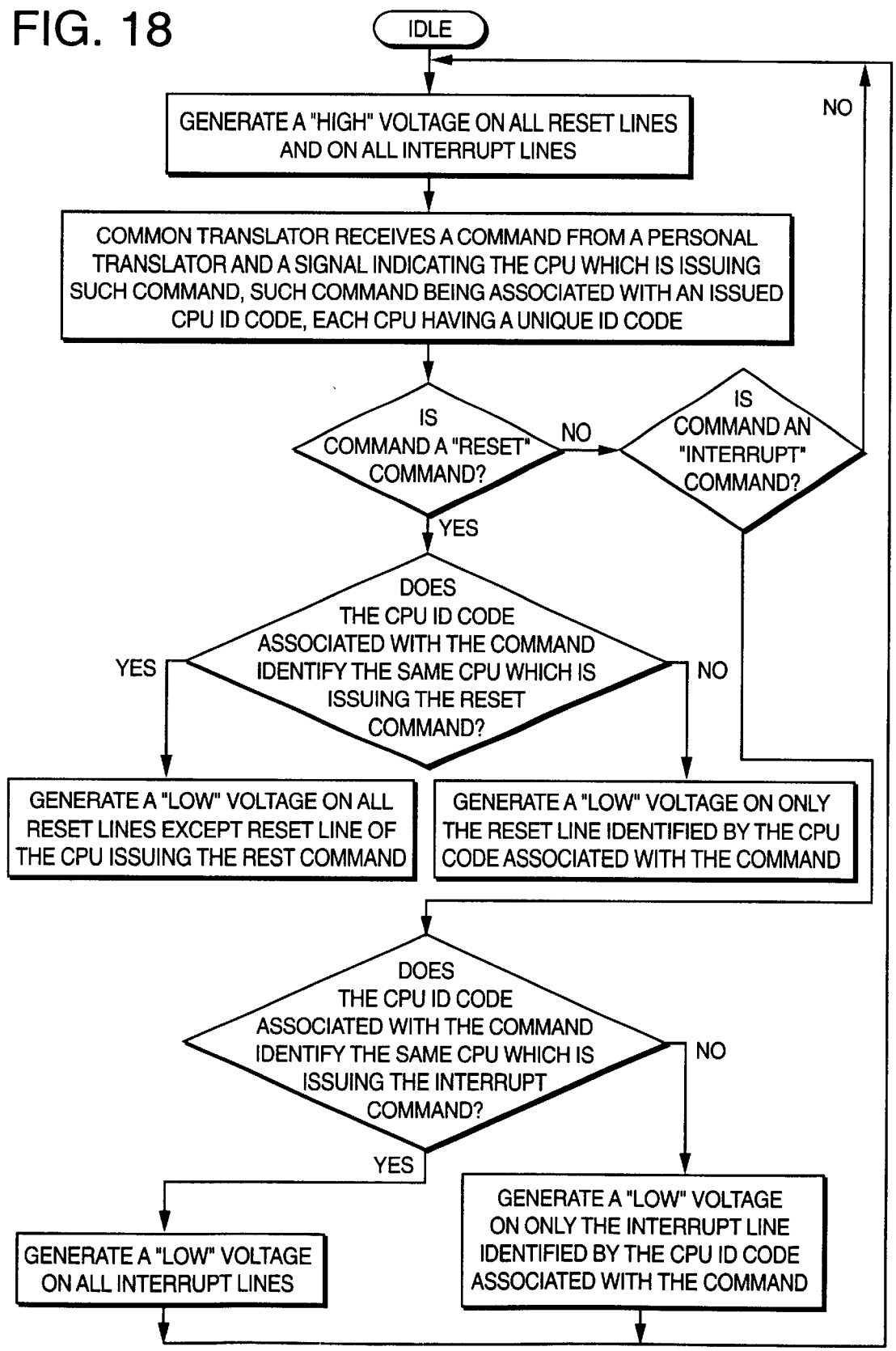
FIG. 18 is a flow diagram of a program stored in the common translator to generate uni-cast or broadcast mode reset and interrupt commands.

Referring now to FIG. 18, a program is stored in the common translator/arbiter 72 (FIGS. 9A, 9B and 9C) for generating the reset command. In response to a rest command issued by one of the CPUs A–D via the data bus thereof and the assert signal from the requesting one of the CPUs, (i.e., a CPU A assert, a CPU B assert, a CPU C assert or a CPU D assert, respectively), the common translator/arbiter 62 will issue a reset command to a designated one of the CPUs to receive such reset command (i.e., either CPU A via a signal on RST_A, or CPU B via a signal on RST_B, or CPU C via a signal on RST_C, or CPU D via a signal on RST–D) in a uni-cast.

More particularly, referring to FIG. 17, in an initial idle state, all the lines RST_A, RST_B, RST_C and RST_D are at a "high" voltage. When the common translator/arbiter 72 receives a command, such command having an ID code as described above for the attention other command, it determines whether the command is a Reset command. If not, it determines whether it is an interrupt command. If neither, it returns to the idle state.

If it is a reset command, the common translator/arbiter 64 determines whether the ID code received with the command is the same as the ID code of the CPU issuing the command via the CPU assert lines. If the CPU ID code with the command is the same as the ID code of the CPU issuing the reset command, the common translator/arbiter 72 drives all reset lines except the reset line of the CPU issuing the command "low" in a broadcast mode. On the other hand, if the CPU ID code with the command is the different from the ID code of the CPU issuing the reset command, the common translator/arbiter 72 drives only the one of the reset lines coupled to the CPU having the ID code with the command "low" in a uni-cast mode Thus, consider for example, the ID code received with the command is ID code 00. Assume also that the CPU A issued the command (i.e., the personal translator $70_1$ (FIGS. 9A, 9B and 9C) produced a request signal on the CPU A assert line). In such case, a broadcast mode is detected by the common translator 72 and "low" voltages are produced on RESET lines RST_B, RST_C and RST_D. However, in this example, if the ID code received with the command from CPU A had been 10 instead of 00, a uni-cast mode is detected by the common translator 72 and "low" voltage is produced only on RESET line RST_C.

If the command was not a reset command but an interrupt command, the common translator/arbiter 64 determines whether the ID code received with the command is the same as the ID code of the CPU issuing the command via the CPU assert lines. If the CPU ID code with the command is the same as the ID code of the CPU issuing the reset command, the common translator/arbiter 72 drives all reset lines the command "low" in a broadcast mode. On the other hand, if the CPU ID code with the command is the different from the ID code of the CPU issuing the reset command, the common translator/arbiter 72 drives only the one of the reset lines coupled to the CPU having the ID code with the command "low" in a uni-cast mode.

Thus, consider for example, the ID code received with the command is ID code 00. Assume also that the CPU A issued the command (i.e., the personal translator $70_1$ (FIGS. 9A, 9B and 9C) produced a request signal on the CPU A assert line). In such case, a broadcast mode is detected by the common translator 72 and "low" voltages are produced on RESET lines RST_A, RST_B, RST_C and RST_D. However, in this example, if the ID code received with the command from CPU A had been 10 instead of 00, a uni-cast mode is detected by the common translator 72 and "low" voltage is produced only on RESET line RST_C.

A number of embodiments of the invention have been described. Nevertheless, it will be understood that various modifications may be made without departing from the spirit and scope of the invention. For example, it should be understood that the address mapping methods and arrangements described above in connection with FIGS. 8 through 16 are not limited to ESCON system. Neither is the generation of the commands described above in connection with FIGS. 16 and 17 limited to ESCON system or to the particular commands described. Thus, other embodiments are within the scope of the following claims.

What is claimed is:

1. A data storage system wherein a host computer is coupled to a bank of disk drives through an interface, such interface comprising:

(A) a plurality of director printed circuit boards;

(B) a plurality of ESCON adapter printed circuit boards;

(C) a plurality of buses; and (D) at least one memory printed circuit board;

(E) a backplane printed circuit board having:
(a) the director boards and memory boards plugged into one side of such backplane printed circuit board and the adapter boards plugged into an opposite side of the backplane printed circuit board;
(b) wherein such backplane printed circuit board has the plurality of busses therein to electrically interconnect directors on the director printed circuit boards, ESCON adapters on the adapter printed circuit boards and at least one memory on the at least one memory printed circuit board with the directors controlling data transfer between the host computer and the bank of disk drives as such data passes through the memory;
(c) wherein a front end portion of the directors are coupled between the host computer and the busses through a front end portion of such ESCON adapters and a back end portion of the directors are between the bank of disk drives and the busses through the back end portion of the adapters; and
(E) wherein each one of such adapter boards comprises:
(a) a plurality of adapter ports each one being coupled to a corresponding port of the host computer;
(b) a plurality of adapter board gate arrays;
(c) a plurality of optic interfaces, each one being coupled between a corresponding one of the adapter port and a corresponding one of the adapter board gate arrays, wherein each coupled optic interfaces and gate array provides a corresponding one of a plurality of channels for the data;
(d) a plurality of adapter board CPUs, each one of the adapter board CPUs being coupled to the adapter board gate arrays and the optic interface of a corresponding one of the channels, each one of the CPUs controlling the initiation and termination of the data passing through said corresponding one of the channels;
(F) wherein each one of the front end portion of the director boards comprises:
(a) a plurality of director board gate arrays;
(b) a plurality of EDACs;
(c) wherein each pair of the director board gate arrays being coupled between a corresponding pair of the adapter board gate arrays and a corresponding one of the EDACs;
(d) a plurality of director board CPUs, each one being coupled to a corresponding one of the adapter board CPUs, each one of the director board CPUs being coupled to a corresponding one of the director board gate arrays to control the initiation and termination of a data transfer through such coupled one of the director gate arrays;
(e) a common state machine coupled to the plurality of director gate arrays and the plurality of EDACs for arbitrating between the pair of director gate arrays coupled to the corresponding one of the EDACs for access to such corresponding one of the EDACs.

2. The system recited in claim 1 wherein each one of the directors comprises:
a plurality of dual port RAMs, each one being coupled to a corresponding one of the EDACs and to at least one of the busses;
a second common state machine coupled to the first common state machine and the plurality of dual port RAMs for arbitrating between the plurality of dual port RAMS for access to one the at least one of the busses.

3. A data storage system wherein a host computer is coupled to a bank of disk drives through an interface, such interface having a plurality of directors and a memory interconnected by a four busses, such directors controlling data transfer between the host computer and the bank of disk drives as such data passes through the memory, such interface comprising:
(A) a printed circuit board having:
(a) a plurality of electrical connectors arranged in a linear array and electrically connected to the busses, such electrical connectors being adapted to receive director printed circuit boards having the directors and the memory printed circuit boards having the memory, and electrically interconnect the directors and the memory received therein to the busses;
(b) wherein a front end portion of the directors are coupled between the host computer and the busses through a front end portion of such ESCON adapters and a back end portion of the directors are coupled between the bank of disk drives and the busses through the back end portion of the adapters;
(c) wherein each one of such adapter boards comprises:
(i) a plurality of adapter ports each one being coupled to a corresponding port of the host computer;
(ii) a plurality of adapter board gate arrays;
(iii) a plurality of optic interfaces, each one being coupled between a corresponding one of the adapter port and a corresponding one of the adapter board gate arrays, wherein each coupled optic interfaces and gate array provides a corresponding one of a plurality of channels for the data;
(iv) a plurality of adapter board CPUs, each one of the adapter board CPUs being coupled to the adapter board gate arrays and the optic interface of a corresponding one of the channels, each one of the CPUs controlling the initiation and termination of the data passing through said corresponding one of the channels; and
(d) wherein each one of the front end portion of the director boards comprises:
(i) a plurality of director board gate arrays;
(ii) a plurality of EDACs;
(iii) wherein each pair of the director board gate arrays being coupled between a corresponding pair of the adapter board gate arrays and a corresponding one of the EDACs;
(iv) a plurality of director board CPUs, each one being coupled to a corresponding one of the adapter board CPUs, each one of the director board CPUs being coupled to a corresponding one of the director board gate arrays to control the initiation and termination of a data transfer through such coupled one of the director gate arrays;
(iv) a common state machine coupled to the plurality of director gate arrays and the plurality of EDACs for arbitrating between the pair of director gate arrays coupled to the corresponding one of the EDACs for access to such corresponding one of the EDACs.

4. The system recited in claim 3 wherein the memory comprises a plurality of memory sections each one having different addresses of the memory, each one of the memory sections being received in a corresponding one of the electrical connectors and being electrically connected to a corresponding one of a pair of the four busses, one of the memory sections being electrically connected to a first bus of the first pair of busses and a second bus of the second pair of busses and the other one of the memory sections being electrically connected to a second bus of the first pair of busses and a first bus of the second pair of busses.

5. The system recited in claim 4 wherein each one of the directors is electrically connected to the plurality of memory sections through the busses.

6. The system recited in claim 3 wherein each one of the directors comprises:

a plurality of dual port RAMs, each one being coupled to a corresponding one of the EDACs and to a pair of the four busses;

a second common state machine coupled to the first common state machine and the plurality of dual port RAMs for arbitrating between the plurality of dual port RAMS for access to one of the pair of four busses.

7. The system recited in claim 6 wherein the memory comprises a plurality of memory sections each one having different addresses of the memory, each one of the memory sections being received in a corresponding one of the electrical connectors and being electrically connected to a corresponding one of a pair of the four busses, one of the memory sections being electrically connected to a first bus of the first pair of busses and a second bus of the second pair of busses and the other one of the memory sections being electrically connected to a second bus of the first pair of busses and a first bus of the second pair of busses.

8. The system recited in claim 7 wherein each one of the directors is electrically connected to the plurality of memory sections through the busses.

9. The system recited in claim 8 wherein each one of the directors comprises:

a plurality of dual port RAMs, each one being coupled to a corresponding one of the EDACs and to at least one of the busses;

a second common state machine coupled to the first common state machine and the plurality of dual port RAMs for arbitrating between the plurality of dual port RAMS for access to one the at least one of the busses.

10. A data storage system wherein a host computer is coupled to a bank of disk drives through an interface, such interface having a plurality of directors and a memory interconnected by a busses, such directors controlling data transfer between the host computer and the bank of disk drives as such data passes through the memory, such interface comprising:

a plurality of ESCON adapters, a front end portion of the directors being coupled between the host computer and the busses through the ESCON adapters;

wherein each one of such adapters comprises:

(a) a plurality of adapter ports each one being coupled to a corresponding port of the host computer;

(b) a plurality of adapter board gate arrays;

(c) a plurality of optic interfaces, each one being coupled between a corresponding one of the adapter port and a corresponding one of the adapter board gate arrays, wherein each coupled optic interfaces and gate array provides a corresponding one of a plurality of channels for the data;

(d) a plurality of adapter board CPUs, each one of the adapter board CPUs being coupled to the adapter board gate arrays and the optic interface of a corresponding one of the channels, each one of the CPUs controlling the initiation and termination of the data passing through said corresponding one of the channels;

(F) wherein each one of the front end portion of the director boards comprises:

(a) a plurality of director board gate arrays;

(b) a plurality of EDACs;

(c) wherein each pair of the director board gate arrays being coupled between a corresponding pair of the adapter board gate arrays and a corresponding one of the EDACs;

(d) a plurality of director board CPUs, each one being coupled to a corresponding one of the adapter board CPUs, each one of the director board CPUs being coupled to a corresponding one of the director board gate arrays to control the initiation and termination of a data transfer through such coupled one of the director gate arrays;

(e) a common state machine coupled to the plurality of director gate arrays and the plurality of EDACs for arbitrating between the pair of director gate arrays coupled to the corresponding one of the EDACs for access to such corresponding one of the EDACs.

* * * * *